US012507920B2

United States Patent
Sridharan et al.

(10) Patent No.: US 12,507,920 B2
(45) Date of Patent: Dec. 30, 2025

(54) STABILIZING MATRICES FOR IMPLANTABLE ELECTROCHEMICAL BIOSENSORS

(71) Applicant: Arizona Board of Regents on behalf of Arizona State University, Scottsdale, AZ (US)

(72) Inventors: Arati Sridharan, Chandler, AZ (US); Jitendran Muthuswamy, Chandler, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 773 days.

(21) Appl. No.: 17/426,497

(22) PCT Filed: Jan. 31, 2020

(86) PCT No.: PCT/US2020/016188
§ 371 (c)(1),
(2) Date: Jul. 28, 2021

(87) PCT Pub. No.: WO2020/160455
PCT Pub. Date: Aug. 6, 2020

(65) Prior Publication Data
US 2022/0095962 A1 Mar. 31, 2022

Related U.S. Application Data

(60) Provisional application No. 62/799,277, filed on Jan. 31, 2019.

(51) Int. Cl.
*A61B 5/1473* (2006.01)
*A61B 5/00* (2006.01)
(Continued)

(52) U.S. Cl.
CPC .......... *A61B 5/1473* (2013.01); *A61B 5/0537* (2013.01); *A61B 5/0538* (2013.01); *A61B 5/6868* (2013.01)

(58) Field of Classification Search
None
See application file for complete search history.

(56) References Cited

U.S. PATENT DOCUMENTS 5,089,112 A    2/1992  Skotheim et al.
8,815,397 B2 * 8/2014  Jiang ............... B82Y 30/00
                                                     428/408

(Continued)

FOREIGN PATENT DOCUMENTS

CN    100406879    *  7/2008
FR    3024982 B1   *  3/2018   ............ C12N 11/14
(Continued)

OTHER PUBLICATIONS

Machine Translation of WO-2005075571, Patent Translate, pp. 1-37, printed on Jul. 12, 2024 (Year: 2007).*
(Continued)

*Primary Examiner* — Jennifer Robertson
*Assistant Examiner* — Om Patel
(74) *Attorney, Agent, or Firm* — Womble Bond Dickinson (US) LLP

(57) ABSTRACT

A soft conductive composite composition can include a soft matrix containing a conductive member that is associated with a bioactive component. The soft matrix can be formed from a silicone composition. The conductive member can be carbon nanotubes in the silicone composition. The carbon nanotubes can have at least two walls and be conductive. Also, the carbon nanotubes can be a mixture of functionalized carbon nanotubes and non-functionalized carbon nanotubes, which mixture can have a ratio of 1:2 to 1:20 w/w of (Continued)

functionalized to non-functionalized carbon nanotubes per gram of the silicone composition. The bioactive component (e.g., enzyme) can be associated with at least a first portion of the carbon nanotubes. A second portion of the carbon nanotubes can be devoid of the bioactive component.

25 Claims, 13 Drawing Sheets

(51) Int. Cl.
  A61B 5/0537 (2021.01)
  A61B 5/0538 (2021.01)

(56) References Cited

U.S. PATENT DOCUMENTS

| | | | |
|---|---|---|---|
| 2004/0111121 A1 | 6/2004 | Brown et al. | |
| 2005/0075708 A1 | 4/2005 | O'Brien et al. | |
| 2009/0038820 A1 | 2/2009 | Keefer | |
| 2010/0144205 A1* | 6/2010 | Searfass | C08J 5/005 977/932 |
| 2014/0127490 A1 | 5/2014 | Islam et al. | |
| 2017/0292063 A1* | 10/2017 | Sturtevant | C01B 32/158 |
| 2018/0001081 A1* | 1/2018 | Minev | A61N 1/375 |
| 2018/0298221 A1* | 10/2018 | Swogger | C09D 5/024 |
| 2021/0071238 A1* | 3/2021 | Palma | C12Q 1/6825 |

FOREIGN PATENT DOCUMENTS

| | | | | |
|---|---|---|---|---|
| WO | WO-2005075571 A1 * | 8/2005 | | B82Y 30/00 |
| WO | WO-2007056372 A2 * | 5/2007 | | A61L 27/303 |
| WO | WO-2007086909 A2 * | 8/2007 | | A61F 2/91 |
| WO | WO-2008074087 A1 * | 6/2008 | | A61K 47/6923 |
| WO | WO-2012145652 A1 * | 10/2012 | | A61B 5/291 |
| WO | WO-2018027117 A1 * | 2/2018 | | C01B 32/158 |

OTHER PUBLICATIONS

Machine Translation of CN 100406879, Patent Translate, pp. 1-12. printed on Aug. 11, 2025 (Year: 2008).*
Machine Translation of FR-3024982-B1, Patent Translate, pp. 1-10. printed on Aug. 11, 2025 (Year: 2016).*
United States Patent and Trademark Office; International Search Report and Written Opinion issued in Int'l Application No. PCT/US20/16188 dated Jun. 16, 2020; 14 pages.
Sridharan et al.; "Penetrating Microindentation of Hypersoft, Conductive Silicone Neural Interfaces in Vivo Reveals Significantly Lower Mechanical Stess"; MRS Adv. col. 4; No. 46-47; pp. 2551-2558; Sep. 17, 2019; 8 pages.
Ahuja, T. et al., "Biomolecular immobilization on conducting polymers for biosensing applications", Biomaterials, Oct. 20, 2006, pp. 791-805.
Alhadrami, H., "Biosensors: Classifications, medical applications, and future prospective", Biotechnology and Applied Biochemistry, Nov. 23, 2017, pp. 497-508.
Armada, M. et al., "Preparation of biosensors based in a siloxane homopolymer with interacting ferrocenes for the amperometric detection of peroxides", Sensors and Actuators B, Apr. 8, 2004, pp. 143-149.
Arslan, A. et al., "Immobilization of tyrosinase in polysiloxane/polypyrrole copolymer matrices", International Journal of Biological Macromolecules, 2005, pp. 163-167.
Bazaka, K. et al., "Implantable Devices: Issues and Challenges", Electronics, Dec. 21, 2012, pp. 1-34.
Cash, K. et al., "Nanosensors and nanomaterials for monitoring glucose in Diabetes", NIH Public Access, Sep. 23, 2010, pp. 1-20.
Cinquin, P. et al., "A Glucose BioFuel Cell Implanted in Rats", PLoS ONE, May 4, 2010, pp. 1-7, vol. 5. Issue 5.

Clark, J. et al., "Chronic microsensors for longitudinal, subsecond dopamine detection in behaving animals", Nature Methods: Brief Communications, Dec. 27, 2009, pp. 126-132, vol. 7, No. 2.
Cordeiro, C. et al., "In vivo continuous and simultaneous monitoring of brain energy substrates with a multiplex amperometric enzyme-based biosensor device", Biosensors and Bioelectronics, Oct. 16, 2014, pp. 677-686.
De Melo-Junior, M. et al., "Polysiloxane-polyvinyl alcohol discs as support for antibody immobilization: Ultra-structural and physical-chemical characterization", Reactive & Functional Polymers, Aug. 30, 2007, pp. 315-320.
Garris, P. et al., "Different Kinetics Govern Dopaminergic Transmission in the Amygdala, Prefrontal Cortex, and Striatum: An in vivo Voltammetric Study", The Journal of Neuroscience, Jan. 1994, pp. 442-450.
Guazzaroni, M. et al., "Layer-by-Layer coated tyrosinase: An efficient and selective synthesis of catechols", Bioorganic & Medicinal Chemistry, Nov. 20, 2011, pp. 157-166.
Jeon, J. et al., "Electrochemical Detection of Neurotransmitters: Toward Synapse-based Neural Interfaces", Biomedical Engineering Letters, 2016, pp. 123-133.
Jin, Z. et al., "Conductive Polymer-Coated Carbon Nanotubes To Construct Stretchable and Transparent Electrochemical Sensors", Analytical Chemistry, Dec. 28, 2016, pp. 2032-2038.
Lee, J. et al., "Flexible electrochemical biosensors based on $O_2$ plasma functionalized MWCNT", Thin Solid Films, Feb. 4, 2009, pp. 3883-3887.
Li, J. et al., "Carbon nanotube/polymer composite electrodes for flexible, attachable electrochemical DNA sensors", Biosensors and Bioelectronics, Apr. 23, 2015, pp. 414-419.
Li, Y. et al., "A disposable biosensor based on immobilization of laccase with silica spheres on the MWCNTs-doped screen-printed electrode", Chemistry Central Journal, 2012, pp. 1-8.
Lillehoj, P. et al, "Rapid, Electrical Impedance Detection of Bacterial Pathogens Using Immobilized Antimicrobial Peptides", Journal of Laboratory Automation, 2014, pp. 42-49, vol. 19(1).
Mannoor, M. et al., "Electrical detection of pathogenic bacteria via immobilized antimicrobial peptides", PNAS, Nov. 9, 2010, pp. 19207-19212, vol. 107, No. 45.
Monosik, R. et al., "Biosensors—classification, characterization and new trends", Acta Chimica Slovaca, 2012, pp. 109-120, vol. 5, No. 1.
Muller, A. et al., "Cell-based reporters reveal in vivo dynamics of dopamine and norepinephrine release in murine cortex", Nature Methods, Oct. 26, 2014, pp. 1245-1255, vol. 11, No. 12.
Nagarale, R.K. et al., "Electrochemical properties of ferrocene modified polysiloxane/chitosan nanocomposite and its application to glucose sensor", Electrochimica Acta, Jun. 12, 2009, pp. 6508-6514.
Niroula, J. et al., "Combined covalent and noncovalent carboxylation of carbon nanotubes for sensitivity enhancement of clinical immunosensors†", ChemComm, 2016, pp. 13039-13042.
Njagi, J. et al., "Amperometric Detection of Dopamine in Vivo with an Enzyme Based Carbon Fiber Microbiosensor", Analytical Chemistry, Feb. 1, 2010, pp. 989-996, vol. 82, No. 3.
Ozer, B. et al., "Amperometric enzyme electrode for free cholesterol determination prepared with cholesterol oxidase immobilized in poly(vinylferrocenium) film", Enzyme and Microbial Technology, 2007, pp. 262-265.
Puentes-Camacho, D. et al., "Functionalization of multiwalled carbon nanotubes by microwave irradiation for lysozyme attachment: comparison of covalent and adsorption methods by kinetics of thermal inactivation", Advances in Natural Sciences: Nanoscience and Nanotechnology, Oct. 9, 2017, 9 pages.
Reuillard, B. et al., "Direct electron transfer between tyrosinase and multi-walled carbon nanotubes for bioelectrocatalytic oxygen reduction", Electrochemistry Communications, Apr. 5, 2012, pp. 19-22.
Rocchitta, G. et al., "Enzyme Biosensors for Biomedical Applications: Strategies for Safeguarding Analytical Performances in Biological Fluids", Sensors, May 30, 2016, pp. 1-21.
Rodeberg, N. et al., "Hitchhiker's Guide to Voltammetry: Acute and Chronic Electrodes for in Vivo Fast-Scan Cyclic Voltammetry", ACS Chemical Neuroscience, Jan. 27, 2017, pp. 221-234.

(56) References Cited

OTHER PUBLICATIONS

Sasso, S. et al., "Electropolymerized 1,2-Diaminobenzene as a Means To Prevent Interferences and Fouling and To Stabilize Immobilized Enzyme in Electrochemical Biosensors", Analytical Chemistry, Jun. 1, 1990, pp. 1111-1117, vol. 62, No. 11.

Sen, S. et al., "Synthesis and Characterization of Polyvinylferrocene/Polypyrrole Composites", Journal of Macromolecular Science, Part A: Pure and Applied Chemistry, 2008, pp. 485-494.

Singh, Y. et al., "Head-to-Head Comparisons of Carbon Fiber Microelectrode Coatings for Sensitive and Selective Neurotransmitter Detection by Voltammetry", Analytical Chemistry, Jul. 19, 2011, pp. 6658-6666.

Tingry, S. et al., "Carbon paste biosensor for phenol detection of impregnated tissue: modification of selectivity by using β-cyclodextrin-containing PVA membrane", Materials Science and Engineering C 26, Dec. 13, 2005, pp. 222-226.

Tolosa, V. et al., "Electrochemically deposited iridium oxide reference electrode integrated with an electroenzymatic glutamate sensor on a multielectrode array microprobe", Biosensors and Bioelectronics, Nov. 6, 2012, pp. 256-260.

Vaddiraju, S. et al., "Emerging Synergy between Nanotechnology and Implantable Biosensors: A Review", NIH Public Access, Mar. 15, 2010, pp. 1-28.

Walcarius, A., "Electrochemical Applications of Silica-Based Organic-Inorganic Hybrid Materials", Chemistry of Materials, 2001, pp. 3351-3372, vol. 13, No. 10.

Wang, Z. et al., "Carbon nanomaterial-based electrochemical biosensors: an overview", Nanoscale, 2015, pp. 6240-6431.

Wilson, G. et al., "Biosensors for real-time in vivo measurements", Biosensors and Bioelectronics, Jan. 15, 2005, pp. 2388-2403.

Xu, J. et al., "A modularized and flexible sensor based on MWCNT/PDMS composite film for on-site electrochemical analysis", Journal of Electroanalytical Chemistry, Oct. 17, 2017, pp. 68-74.

Zebda, A. et al., "Single Glucose Biofuel Cells Implanted in Rats Power Electronic Devices", Scientific Reports, Mar. 22, 2013, pp. 1-5.

Zimmerman, J. et al., "Simultaneous Electrochemical Measurements of Oxygen and Dopamine in Vivo", Analytical Chemistry, Jan. 1, 1991, pp. 24-28, vol. 63, No. 1.

\* cited by examiner

STABILIZING MATRICES FOR IMPLANTABLE ELECTROCHEMICAL BIOSENSORS

CROSS-REFERENCE

This patent application claims priority to U.S. Provisional Application No. 62/799,277 filed Jan. 31, 2019, which provisional is incorporated herein by specific reference in its entirety.

GOVERNMENT RIGHTS

This invention was made with government support under 1650566 awarded by the National Science Foundation. The government has certain rights in the invention.

BACKGROUND

Field

The present disclosure relates to soft conductive compositions that can be used for an implant. More particularly, the present disclosure relates to soft conductive composite compositions having a soft matrix containing electrically conductive components that are associated with bioactive components, which matrix can be used for protecting an implant.

Description of Related Art

Implantable electrochemical sensors offer continuous, real-time, label-free, monitoring of biologically relevant analytes, such as metabolites (e.g., glucose, pyruvate, lactate etc.), pathogenic microbial antigens, cancer causing peptides, dissolved gases such as oxygen, and neurotransmitters in peripheral and central nervous systems (e.g., glutamate, dopamine, serotonin, acetylcholine etc.) with high sensitivity and response times. In addition, implantable biofuel cells (e.g., GBFCs) can utilize endogenous biological components (e.g., glucose) to power chronic implants, such as pacemakers and other bioelectric or optical neuromodulation stimulation devices. However, significant biocompatibility issues, such as biofouling, interference, and inflammation associated reactions and tissue damage limit the lifetime of these implants in the brain and other organs. Typical lifetimes are 2-4 weeks of response times, beyond which the response considerably degrades or requires multiple recalibrations prior to complete failure.

Improvements in durability and extended use (e.g., 3 month storage stability with at least 28 days operational stability) for an electrochemical sensor have been obtained using ultra-small (~7 µm) carbon fibers as the biosensor. However, it is not always feasible to ultraminiaturize the design of an electrochemical device. Implantable electrochemical sensors have numerous challenges that lead to lower performance under in vivo conditions. Some key issues include biofouling, interference, loss of activity due to leaching, and instability in response. Often, problems associated with implantable electrochemical sensors can arise at least partially due to the mechanical mismatch at the implant tissue interface that results in the inflammatory response and scarring around the implant.

Previously, a soft, brain-like, mechanically-matched conductive silicone material was developed that enables stable electrical characteristics when implanted in the cortex or located at any vital organ-implant interface. However, the applications of use for the conductive silicone material are limited.

Therefore, there is a significant need for innovative strategies to stabilize the implant-tissue interface for the functioning of long-term, chronic, electrochemical-based devices.

SUMMARY

In some embodiments, a soft conductive composite composition can include a soft matrix (e.g., polymer) containing a conductive member (e.g., carbon nanotube) that is associated with a bioactive component (e.g., enzyme). The soft matrix can be formed from a silicone composition. The conductive member can be carbon nanotubes in the silicone composition. The carbon nanotubes can have at least two walls and be conductive. Also, the carbon nanotubes can be a mixture of functionalized carbon nanotubes and non-functionalized carbon nanotubes, which mixture can have a ratio of 1:2 to 1:20 w/w of functionalized carbon nanotubes to non-functionalized carbon nanotubes per gram of the silicone composition. The bioactive component (e.g., enzyme) can be associated with at least a first portion of the carbon nanotubes. A second portion of the carbon nanotubes can be devoid of the bioactive component. The bioactive component (e.g., enzyme) can be selected to perform a biochemical reaction with a substrate for the bioactive component. The electrical production of the substrate interacting with the bioactive component can be passed through the associated carbon nanotube and through the other carbon nanotubes to pass electrical signals. For example, the soft conductive composite composition can be located on a probe that measures the electrical signals for assessing a biological function.

In some embodiments, a device can include a probe or electrode having the soft conductive composite composition thereon, which can be a partial surface coating, full surface coating, partial encapsulation, or full encapsulation. Accordingly, the soft conductive composition can coat at least a portion of an implantable end of the probe. The soft conductive composition can include a silicone composition containing a plurality of carbon nanotubes. A bioactive component can be associated with at least a first portion of the carbon nanotubes. The bioactive component can perform a biochemical reaction with a substrate for the bioactive component. The carbon nanotubes can have at least two walls and the carbon nanotubes are a mixture of functionalized carbon nanotubes and non-functionalized carbon nanotubes at a ratio of 1:2 to 1:20 w/w of functionalized carbon nanotubes to non-functionalized carbon nanotubes per gram of the silicone composition.

A method of making the soft conductive composition can include: selecting PDMS precursors; selecting the carbon nanotubes to have the ratio of functionalized carbon nanotubes to non-functionalized carbon nanotubes; adsorbing a bioactive agent onto at least a portion of the carbon nanotubes; cross-linking the PDMS precursor to obtain the silicone composition with an elastic modulus of about 3-9 kPa and/or a short-term relaxation time-constant of about 10-20 sec; and introducing the carbon nanotubes into the PDMS precursors and/or crosslinked PDMS to form a soft conductive composite composition.

In some embodiments, a method of making an implant can include: selecting PDMS precursors; cross-linking the PDMS precursor to obtain an elastic modulus of about 3-9 kPa or +/−1%, 5%, 10%, 20%, or 50% and a short-term relaxation time-constant of about 10-20 sec or +/−1%, 5%, 10%, 20%, or 50%; selecting carbon nanotubes; adsorbing a bioactive agent onto at least a portion of the carbon nanotubes; introducing the carbon nanotubes into the PDMS precursor and/or crosslinked PDMS to form a soft conductive composite composition; and coating the soft conductive composite composition onto at least a portion of an implant.

In some embodiments, the method of making the implant can include: obtaining a graph or other data having a crosslinker to base curve for the crosslinker and base PDMS precursor; determining a desired elastic modulus and short-term relaxation time-constant; determining an amount of crosslinker for an amount of base PDMS precursor; and crosslinking the base PDMS with the amount of crosslinker according to the curve to obtain the desired elastic modulus and short-term relaxation time-constant for the soft conductive composition.

In some embodiments, a method of measuring properties at a neural interface can include: providing a neural probe having a soft conductive composition, the soft conductive composition comprising a crosslinked silicone composition containing a plurality of carbon nanotubes, wherein at least a portion of the carbon nanotubes are associated with a bioactive component (e.g., bioactive component adsorbed onto surface of carbon nanotube); implanting the neural probe having the soft conductive composition at a neural interface; and measuring a property with the neural probe.

In some embodiments, an implant for a tissue can include an implant having a surface, and a crosslinked silicone composition on the surface. The crosslinked silicone composition can have an elastic modulus adapted to be implanted into a tissue having the elastic modulus of the crosslinked silicone composition, or +/−1%, 5%, 10%, 20%, or 50% thereof. The degree of elastic modulus is determined by a ratio of crosslinker and base and can be tailored to match a specific tissue or tissue interface. The silicone composition contains a plurality of carbon nanotubes, wherein at least a portion of the carbon nanotubes are coated with a bioactive component.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1A:
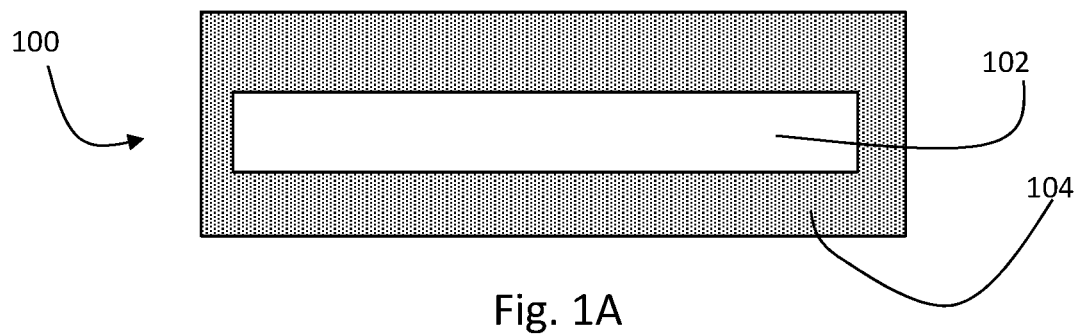
FIG. 1A shows a schematic representation of an implant having an implant substrate and a soft conductive material encapsulating the implant.

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology includes electrochemical biosensors having biocompatible materials that provide a soft interface material that can be implanted as an implant or coated onto a harder material for an implant. The interface material can include viscoelastic properties that match that of an organ or tissue, such as brain tissue. The biocompatible material can include conductive elements, such as particles or other structures (e.g., carbon nanotubes) that can function at neural interfaces, and improve the long-term, electrical performance of an electrode implant at the neural interface. The biocompatible material may also include electrochemical members that can function as biosensors. The electrochemical members can include biological components that interact with substrates for biochemical reactions that generate electrical potential. The biological components may be bioactive components that are active when interacting with the substrate to create a biologically based electrochemical signal. The biological components may be associated with at least a portion of the conductive elements, which can be by adsorption on a surface of the conductive elements or covalently coupled therewith.

In an embodiment, the electrochemical biosensor can include a silicone composition, carbon nanotubes in the silicone composition, and a bioactive component associated with at least a first portion of the carbon nanotubes. In some aspects, the bioactive component performs a biochemical reaction with a substrate for the bioactive component. A second portion of carbon nanotubes can be devoid of the bioactive component.

The silicone composition having the carbon nanotubes and bioactive components can be used for electrochemical and electroactive implants and biosensors. The conductive silicone material can be configured to function as an immobilization and signal transducing scaffold for enzymes and other bioactive components for stable and targeted response at the device-tissue interface. The device and silicone composition can provide scalable devices over a wide range of dimensions, such as nanoscale and higher, for wearable devices for diagnoses and therapies of chronic disease conditions. As a specific example, the present invention can include an enzyme-based, potentiometric, amperometric or conductometric biosensor having adsorbed carbon nanotube electroactive silicone (ACES). The bioactive component can be any enzyme, such as tyrosinase (e.g., a dopamine sensitive enzyme), or any other biorecognition element.

Examples of the bioactive components can be enzymes such as glucose oxidase, glucose-1-dehydrogenase, hexokinase, lactate oxidase, pyruvate oxidase, pyrrole-quinoline-quinone enzymes, catalase, horseradish peroxidase, neurotransmitter sensitive enzymes such as tyrosinase, polyphenol oxidase, glutamate oxidase, acetylcholinesterase, choline oxidase, protein receptors (i.e., cytokine receptors (i.e., TNF receptor family), ryanodine receptors, G-protein coupled receptors, etc.), extracellular matrix derived peptides (RGD, cadherins, integrins), and/or nucleotide based oligomers (siRNA, RNAi, aptamers), as well as others.

Examples of immobilization matrices and polymers for use in the device can include silicone matrices of various types. Siloxane based matrices can be used as immobilization mediums for electrochemical sensors.

In some embodiments, the conductive composition for use with an electrochemical biosensor can include a tissue specific mechanically-matched soft silicone (e.g., PDMS) incorporated with carbon nanotubes (e.g., SWCNTs, or MWCNTs) for enhanced conductivity with the bioactive components associated with some of the carbon nanotubes. The conductive composition can include some carbon nanotubes that are functionalized and some carbon nanotubes that are not functionalized. The conductive composition can include some carbon nanotubes that are associated with the bioactive component (e.g., non-functionalized), and some carbon nanotubes that are not associated with the bioactive component (e.g., functionalized). The functionalization can be provided via chemically coupling a chemical moiety to the carbon nanotube that increases the conductivity of the carbon nanotube. The functional chemical moiety can include carboxylic acid, or other functional group that can increase the conductivity, such as alkanes, alkenes, alkynes, amides, hydrides, heterocycles, transition metal oxides, peptides, DNA, RNA, proteins. In some aspects, the functional groups specifically increase the conductivity.

The conductive composition can be configured as a molecular wiring matrix to act as transducers for biorecognition elements (e.g., bioactive components) incorporated within it. The conductive composition can be a nanocomposite with tunable physical properties and conductivity. The conductive composition can be implanted at neural interfaces for long-term, chronic neuromodulation applications when covering a probe or electrode. The conductive composition can be configured to match material properties of the brain or other tissue in vivo so that the elastic modulus of the composition matches the elastic modulus of the tissue. The conductive composition on a probe or electrode can achieve stable bioactive component signal generation and electrical conductivity properties in vivo. The conductive composition can include a silicone-CNT-bioactive component nanocomposite as a tissue-interface composition for implantable electrochemical sensors and devices.

In some embodiments, the material has an elastic modulus that is brain-like, thereby the material provides a soft elastomeric interface with an elastic modulus of ~5-8 kPa and has a time-constant of relaxation after a step-indentation that is closely matched with the visco-elastic properties of a target tissue, such as the brain or other tissue. This allows the material to be used at an interface of a tissue and an implant (e.g., hard material of implant). The elastomeric material with tissue-like mechanical properties can be prepared as composites of PDMS derivatives having conductive elements, such as single-wall carbon nanotubes (SWCNTs) and multi-walled nanotubes (MWCNTs) or any carbon nanotubes. Bioactive components, such as enzymes, receptor proteins, or others (e.g., that interact with a substance to generate electric potential), may be associated with at least a portion of the nanotubes, such as the MWCNTs, where the association may be by adsorption onto a surface or via covalent coupling. The electrical performance of implants coated with the conductive elastomeric material can provide good electro-chemical impedance spectra.

Mechanically-matched biocompatible coatings can improve long-term biocompatibility on biomedical implants. The mechanical match between biomaterial and implant can lead to long-term functional performance.

In some embodiments, probes can be implanted. As such, interfaces of probes and tissue can be prepared so that mechanically the probe has an elastic modulus that matches the tissue. It has been found that correct mechanical matching can be useful for implants that are implanted into soft tissues, such as the brain. The mechanical matching can be useful for numerous implants for different visceral organs and ultra-soft biological systems by matching the elastic moduli of organs to a tunable, silicone material. Silicone based materials better emulate the mechanical properties of biological systems by their viscoelastic and general elastic moduli parameters.

Now, implants can include a correct mechanical match between cortical implants and the brain via a silicone based material. Materials between $10^0$ Pa to $10^3$ Pa can include polyacrylamine, dextran, gelatin, agarose, hyaluronic acid, or others. Materials between $10^2$ Pa to $10^6$ Pa can include polyethylene glycol (PEG), crosslinked gelatin, methylcellulose, or others. Materials between $10^5$ Pa to $10^9$ Pa can include Teflon (e.g., tetrafluoroethylene, PTFE), polyamidoamine (PAMAM) dendrimer, polyvinylacetate, polyvinylacetate/cellulose, rubbers, polydimethylsiloxane (PDMS), or others. Materials between $10^9$ Pa to $10^{10}$ Pa can include parylene-C, polymethylmethacrylate (PMMA), polyvinylfluoride films, polyimide, polystyrene, polyethylene terephthalate (PET), or others. Materials between $10^{10}$ Pa to $10^{12}$ Pa can include carbon nanotubes, tungsten, stainless steel, polysilicon, or others. It should be noted that a single neuron is between about $10^1$ Pa to $10^2$ Pa. It should be noted that a single astrocyte is between about $10^2$ Pa to $10^3$ Pa. It should be noted that brain tissue is between about $10^3$ Pa to $10^4$ Pa. It should be noted that a blood vessel is between about $10^5$ Pa to $10^6$ Pa. It should be noted that dura mater is between about $10^7$ Pa to $10^8$ Pa. It should be noted that bone is between about $10^9$ Pa to $10^{10}$ Pa. It should be noted that tissue scaffolds are between about $10^0$ Pa to $10^7$ Pa. It should be noted that insulation material can be between about $10^6$ Pa to $10^7$ Pa. It should be noted that electrodes are between about $10^{10}$ Pa to $10^{13}$ Pa. Accordingly, the location of the implant and biomaterial that will be associated with the implant can be used to determine the material that is used as an outside material of an implant. The material can then be prepared to match the tissue.

In some embodiments, the material can include PDMS or a derivative thereof. PDMS can have protein adhesion characteristics, which may be favorable in some instances. In other instances, the surface of the soft conductive composition can be modified to have less adhesion with proteins, such as by passivation or making it hydrophilic or coating with a hydrophilic coating (e.g., PEG). The PDMS surface chemistry is highly conducive to strategies that may prevent protein adsorption, such as prevention of hydrophobic recovery using presoaking conditions (e.g., presoaking in aCSF for 24 hours) and other surface chemical modifications. Surface chemical modification can include; hydrosilanization treatment of PDMS surfaces with DC1107 (Dow Corning) and 2% triflic acid in methanol for Si—H surface functionalization and subsequent hydrosilylation reaction by refluxing the substrate in a solution with equal parts of diethylene glycol dimethylether and poly(ethylene glycol) monoallylether (allyl-PEO-OH) with Karstedt's Pt catalyst for 2 hours. The PEO/PEG groups will prevent non-specific protein adhesion and are for increased hydrophilicity. Functionalization for specific applications (e.g., with selective peptides) is also a possibility.

A method for preparing a conductive silicone composite for any degree of elastic modulus (e.g., softness) can be used for preparing the implants of the invention that are matched with a specific organ or tissue for matching mechanical properties. In step 1, the silicone precursor base, crosslinker, and conductive implant material (e.g., functionalized carbon nanotubes) are provided. In step 2, the silicone precursor base is reacted with the crosslinker (e.g., vinyl crosslinker) in a manner where the ratio of crosslinker:base is determined in order to obtain the desired elastic modulus for the silicone composite, where the silicone precursor base and crosslinker are pre-mixed (e.g., about 5 minutes). In step 3, the crosslinked silicone is combined with the conductive implant material and mixed vigorously for about 5 minutes to about 15 minutes by standard mixing (e.g., any type of mixing) or gentle sonication. A portion of the conductive implant material, such as carbon nanotubes may have the bioactive component associated therewith. Alternatively, step 3 includes a first action to combine conductive implant materials with the crosslinked silicone and then a second action to combine conductive implant materials having the bioactive component associated therewith with the crosslinked silicone. It should be recognized that the crosslinking step may occur after the conductive implant material with and/or without the associated bioactive component is mixed with the silicone precursor base and crosslinker, before mixing, or during mixing.

In step 3, the conductivity of the resulting implant can be controlled by controlling the amount of conductive implant material, such as by controlling the amount of functionalized carbon nanotubes and/or by controlling the amount of carbon nanotubes associated with the bioactive component. The conductive implant material (e.g., functionalized carbon nanotube-COOH) can be suspended in a solvent, such as toluene, TMF, or DMSO, to disperse bundles for higher conductivity prior to mixing with the silicone precursor base and crosslinker or with the crosslinked silicone. For about 1 mg conductive implant material per 500 mg (base), about 30-40 kohms*cm resistivity can be about 0.2% w/w, which can be modulated to obtain the desired modulus and conductivity, such as up to 5% w/w without significant change of the elastic modulus. In some aspects, for better dispersion, mechanical dispersion methods may be used, such as grinding in mortar and pestle, or others.

In step 4, the mixture is no longer mixed and allowed to rest for about 15 minutes to 2 hours (or other time) at room temperature (or other temperature) in a vacuum chamber, which can remove bubbles and allow for better equal dispersion of the carbon nanotubes with or without associated bioactive components and/or with or without a crosslinker into the elastomer matrix.

In step 5, the mixture is then heated to 60-80 degrees C. for up to 18 hours or more. In some aspects, step 5 can use thermal induction of polymerization. At room temperature it can take about 60 hours to achieve the same modulus. At a higher temperature of about 120 degrees C. it can be about 1 hour for 1-3 g small batches, or at 90-105 degrees C. for 3 min for coatings. Also, UV/photocurable crosslinkers can be used with the carbon nanotubes with and/or without associated bioactive components incorporated in the matrix.

In step 6, the crosslinked polymer is placed into a solution with similar osmolarity plus salt balance compared to an organ of interest (e.g., brain artificial cerebrospinal fluid) for at least 12 hours, or at least 24 hours, or where this solution is used for storage of the crosslinked polymer. Optionally, a step to passivate the surface of the crosslinked polymer can be performed to render it hydrophilic (without using $O_2$ plasma). Chemical addition of PEG or other hydrophilic polymer can be optional. Also, optionally, the surface of the polymer can be made conductive to electron transport under aqueous conditions. Another option is to remove unreacted vinyl or other unreacted reagents.

It has been found that the soft conductive composition can also be used for interfaces between implants and other tissues. That is, the implant includes the soft conductive composition on a surface that interfaces with a tissue. As such, the tissue can be selected, and the elastic modulus of the tissue can be identified. The soft conductive composition can then be prepared with selective crosslinking to obtain about the elastic modulus of the tissue. The selective crosslinking can be obtained by using a graph or other data that shows the obtained elastic modulus for the ratio of crosslinker to base (e.g., PDMS precursor or reagent). The carbon nanotubes with and/or without associated bioactive component can be added, such as the amounts described herein, when for use in conductivity or on a conductive interface. The carbon nanotubes can be minimal when not used as a conductive interface. The soft conductive composition can then be coated on a medical device (e.g., implantable medical device) or other implant. The coating can be onto a polymeric, ceramic, composite or metal surface or any other type of surface. The soft conductive composition can then be processed, such as by passivation or otherwise making it hydrophilic, before implantation.

Potential applications of the soft conductive composition include any of the following, with the elastic modulus being matched to the tissue into or onto which the implant is implanted: artificial tissue implants as coating or matrix; implantable microfluidics as coating on microfluidics; inert coatings for implantable micro-devices, such as glucose sensors, insulin pumps, etc.; 'smart' interfaces (e.g., coatings) for implantable bioelectronics (i.e., PCBs, microchips) using PDMS/Nanotube interface; coatings or matrix for artificial organs (e.g., via 3D Bioprinting); encapsulation of small populations of genetically modified cell/tissues; or coating of catheters or other similar device.

As recited herein, the elastic modulus can be modulated by modulating the degree of crosslinking. As such, modulating the degree of crosslinking can be performed by modulating the weight ratio of crosslinker to base ratio. Here, the crosslinker is the chemical that causes crosslinking to occur, such as crosslinking the molecules of the base. Also, the base is the chemical that is being crosslinked, such as the reagent that is crosslinked into PDMS. Table 1 shows the changes of elastic modulus by modulating the crosslinker to base ratio.

TABLE 1

Effect of crosslinker to base ratios of PDMS/functionalized carbon nanotube composite on elastic modulus

| Crosslinker to Base Ratio | Elastic Modulus (kPa) |
|---|---|
| 0.1 (1:10) | 846 |
| 0.05 (1:20) | 40 |
| 0.025 (1:40) | 16.3 |
| 0.020 (1:50) | 17.9 |
| 0.0125 (1:80) | 0.756 |

The reported elastic modulus for PDMS/carbon nanotube composite is lower than that for PDMS alone. For instance, an example composite is approximately 3 times softer compared to elastic modulus values (2.6 MPa) for 1:10 (v/v) ratio for PDMS (Sylgard 184). In an example, the example having 1:10 crosslinker:base composite is much closer to the literature equivalent PDMS values of 1:25.

In some embodiments, a soft conductive composite composition can include a silicone composition having carbon nanotubes with a bioactive components associated therewith. The carbon nanotubes can be in the silicone composition. The carbon nanotubes can have at least two walls. The carbon nanotubes can be a mixture of functionalized carbon nanotubes and non-functionalized carbon nanotubes, such as at a ratio of 1:2 to 1:20 w/w of functionalized carbon nanotubes to non-functionalized carbon nanotubes per gram of the silicone composition. The bioactive component can be associated with at least a first portion of the carbon nanotubes, wherein the bioactive component performs a biochemical reaction with a substrate for the bioactive component. In some aspects, the ratio is about 1:10 w/w functionalized carbon nanotubes to non-functionalized carbon nanotubes per gram of the silicone composition, or from 1:3 to 1:18, or 1:5 to 1:15, or 1:7 to 1:12. w/w/In some aspects, the carbon nanotubes have about 2 to about 50 walls, or about 3 to about 40 walls, or about 4 to about 30 walls. In some aspects, the carbon nanotubes have a length of about 5 μm to about 100 μm, or about 10 μm to about 75 μm, or about 20 μm to about 50 μm, or about 30 μm to about 40 μm, or about 10 μm to about 50 μm. In some aspects, the carbon nanotubes have a resistivity of about 1 kohms to about 500 kohms across 1 cm length cylinder, or about 10 kohms to about 250 kohms, or about 50 kohms to about 150 kohms, or about 75 kohms to about 100 kohms. In some aspects, the carbon nanotubes have a resistivity of about 2 kohms to about 300 kohms across 1 cm length cylinder, or about 10 kohms to about 250 kohms, or about 50 kohms to about 150 kohms, or about 75 kohms to about 100 kohms.

In some embodiments, the crosslinker, silicone precursor base, and conductive carbon nanotubes can be prepared into a soft conductive composite composition. Such a soft conductive composite composition can include a crosslinked silicone composition, and single-walled or multi-walled carbon nanotubes in the silicone composition. In some aspects, the soft conductive composite can have an elastic modulus of about 4 kPa, 3 to 8 kPa, or 2 to 9 kPa, or +/−1%, 5%, 10%, 20%, or 50%. In some aspects, the soft conductive composite can have a short-term relaxation time-constant of about 2-30 seconds or +/−1%, 5%, 10%, 20%, or 50%. In some aspects, the soft conductive composite has an elastic modulus of about 5-8 kPa or +/−1%, 5%, 10%, 20%, or 50%. In some aspects, the soft conductive composite can have a short-term relaxation time-constant of about 2-30 sec or +/−1%, 5%, 10%, 20%, or 50%. In some aspects, the soft conductive composition has an elastic modulus matched with brain tissue or other soft tissue of interest. In some aspects, the soft conductive composition is crosslinked with a vinyl crosslinker. In some aspects, the soft conductive composition includes Sylgard 184. In some aspects, crosslinking of the soft conductive composition is defined by the ratio of the crosslinker and base.

In some embodiments, the amounts of functionalized carbon nanotubes, non-functionalized nanotubes, and bioactive component can vary per gram of soft silicone matrix or matrix premix as follows. In some aspects, the amount of functionalized carbon nanotube can range from about 0.1 mg to about 10 mg, from about 0.5 mg to about 5 mg, or about 0.75 mg to about 2 mg, or about 1 mg. In some aspects, the amount of non-functionalized carbon nanotube can range from about 1 mg to about 100 mg, from about 5 mg to about 50 mg, or about 7.5 mg to about 20 mg, or about 10 mg. In some aspects, the amount of bioactive component associated with the carbon nanotubes can range from about 0.05 mg to about 2 mg, about 0.1 mg to about 1, or about 0.2 mg to about 0.5 mg. In some aspects, the soft conductive composition includes the carbon nanotubes at less than 5% w/v. In some aspects, the soft conductive composition includes the carbon nanotubes at a range of about 0.2% to 1% w/v.

In some aspects, the soft conductive composition is configured for electrical conductance by varying the amount of carbon nanotubes, with more (e.g., higher concentration) being more conductive and less (e.g., lower concentration)

being less conductive. In some aspects, the soft conductive composition can be configured as an implant, such as for brain interface implantation, by having a matching elastic modulus. The soft conductive composition can be applied to an implantable medical device. The soft conductive composition can be configured to stabilize electro-chemical impedance and to stabilize neural recordings.

In some aspects, the soft conductive composition is configured for electrochemical signaling with the bioactive component, such as by varying the amount of bioactive agent associated with the carbon nanotubes, with more (e.g., higher concentration) being more active and conductive and less (e.g., lower concentration) being less active and conductive. The soft conductive composition can be applied to an implantable medical device. The soft conductive composition can be configured to stabilize electro-chemical impedance and to stabilize neural recordings.

In some embodiments, the soft conductive composition can be applied to an implant, and may be an outer coating of a portion or the entirety of the implant. An example can include a neural probe coated with the soft conductive composition. The soft conductive composition is configured to be stable when implanted in order to maintain stable mechanical properties for at least 4 weeks, such as when on an implant. In some aspects, the soft conductive composition at least partially coats a conventional metal implant or doped semiconductor implant.

In some embodiments, the soft conductive composition includes a biological active agent, such as a drug. The drug can be therapeutic for a disease or to inhibit a biological process such as inflammation that can occur around an implant. In one example, the soft conductive composition can include an anti-inflammatory contained therein.

In some embodiments, the soft conductive composition has a biocompatible coating thereon. Often, the coating is softer than the soft conductive composition, and can be any biocompatible composition, such as a biocompatible polymer.

In some aspects, the soft conductive composition is a silicone composition, such as a PDMS silicone. The silicone composition can be a derivative of PDMS silicone. The silicone composition can be crosslinked. For example, the silicone composition is crosslinked by selecting an amount of crosslinking to arrive at the desired elastic moduli.

In some embodiments, the conductive material in the soft conductive composition is a carbon nanotube, which can be present at less than 5%, about 0.2% to 1% w/w, or less than 1% w/v. In some aspects, a portion of the carbon nanotubes can include carboxylic acid functional groups. In some aspects, a portion of the carbon nanotubes can be devoid of carboxylic acid functional groups. In some aspects, a portion of the carbon nanotubes can include the bioactive agent. In some aspects, a portion of the carbon nanotubes can include carboxylic acid functional groups, some can be devoid of the carboxylic acid functional group, some can include the bioactive component, some can be devoid of the bioactive component, and combinations thereof. The carbon nanotubes can be included in 5 nm×500 nm bundles or individual nanotubes.

In some embodiments, an implant can include an insulation material (e.g., insulating rubber or polymer) between the harder implant body and soft conductive composition. On the other hand, the composition can be devoid of insulation between the implant and soft conductive composition. In some aspects, the implant is devoid of an insulation material between the implant body and soft conductive composition.

In some embodiments, the hard implant body can be a metal implant, such as a material that includes a metal selected from the group consisting of stainless steel, platinum, platinum-iridium, silver/silver-chloride, gold, and tungsten In some aspects, the soft conductive composition includes a relaxation time constant to match the relaxation time constant of brain or other soft tissue of interest.

In some embodiments, an implant can include a solid member (e.g., hard, soft, or flexible) member having the soft conductive composition thereon, whether partially or completely encapsulating the member or coated on an implantable portion, where a non-implantable portion may be devoid of the soft conductive composition. In some aspects, the solid member may be a neural probe. In some aspects, the implant may include: a neural probe; a soft conductive composition coating an implantable end of the neural probe, the soft conductive composition comprising a cross-linked silicone composition containing a plurality of single-walled or multi-walled carbon nanotubes with or without functionalization and/or with or without the bioactive component. However, the substrate may be a sensor or sensor portion that is implanted or at least introduced into a biological fluid and/or introduced to contact soft tissue in a subject. The soft conductive composition may include any of the properties described herein, such as elastic modulus, electrical conductance, or the like. In some aspects, the member is configured as an implant, such as for brain interface implantation. In some aspects, the soft conductive composition has a desired degree of crosslinking that is obtained by a selected ratio of crosslinker to base. The member can be considered to be a substrate, such as a macro substrate, which is distinguishable from an enzymatic substrate of a bioactive component.

In some aspects, the macro substrate is a neural probe or other sensor with electrical conductance. The soft conductive material can be configured to stabilize electro-chemical impedance over implant durations lasting more than 1 year. In some aspects, the sensor can be a neural probe and the soft conductive material is configured to stabilize neural recordings from the neural probe. In some aspects, an elongate portion of the neural probe or other sensor or implant can be coated with the soft conductive composition. In some aspects, the soft conductive composition at least partially coats a conventional metal implant or doped semiconductor implant.

In some embodiments, a method of making an implant or an implantable portion of a medical device, or other device is provided. Such a method of making can include: selecting one or more PDMS precursors; crosslinking the PDMS precursor to obtain an elastic modulus of about 3-9 kPa or +/−1%, 5%, 10%, 20%, or 50%; selecting the conductive elements to be carbon nanotubes or other conductive elements; introducing the carbon nanotubes or other conductive elements with or without functionalization and/or with or without an associated bioactive component into the crosslinked PDMS to form a soft conductive composite composition; and coating the soft conductive composite composition onto a device. In some aspects, wherein the implant portion having the soft conductive composition includes metal implants or doped semiconductor implants.

In some aspects, the method can include degassing/debubbling the soft conductive composite composition. In some aspects, the method can include dry incubating the neural probes coated with the soft conductive composite composition. In some aspects, the dry incubating is at less than 5% humidity. In some aspects, the dry incubating is at a temperature of about 60 degrees C., or +/−1%, 5%, 10%, 20%, or 50%. This method can be applied to any macro substrate.

In some embodiments, the method can include curing the soft conductive composite composition onto the neural probe, such as at about 3 minutes at about 12-15% humidity. However, it should be recognized that these parameters may vary, such as by +/−1%, 5%, 10%, 20%, or 50%.

In some embodiments, the method can include testing the soft conductive composition assessing whether or not the soft conductive composite composition has a strong hysteresis.

In some embodiments, the method can include rinsing the implant (e.g., neural probe) having the soft conductive composition with deionized water.

In some embodiments, the method can include passivating the surface of the soft conductive composition. In some aspects, the method can include passivating the device having the soft conductive composition with aCSF (7.4 g sodium chloride, 2.1 g sodium bicarbonate, 0.17 g sodium phosphate monobasic, 0.19 g magnesium chloride, 4.5 g glucose in filtered, 1 liter of deionized water, +/−1%, 5%, 10%, 20%, or 50% of any component). In some aspects, the method can include incubating the soft conductive composition in a fluid having similar osmolarity as the brain. In some aspects, the method can include passivating the surface of the soft conductive composition for 24 hours.

In some embodiments, the method can include mechanically characterizing the neural probe having the soft conductive composition to have an elastic modulus of about 3-9 kPa or +/−1%, 5%, 10%, 20%, or 50%. In some aspects, the method can include assessing stability by incubating the neural probe having the soft conductive composition in aCSF (7.4 g sodium chloride, 2.1 g sodium bicarbonate, 0.17 g sodium phosphate monobasic, 0.19 g magnesium chloride, 4.5 g glucose in filtered, deionized water) for at least 1 week.

In some embodiments, the method can include controlling the degree of cross-linking the PDMS precursor to obtain the elastic modulus. In some aspects, the method can include using the tuning curve for elasticity versus ratio of crosslinker to base in order to tune the elastic moduli to match the elastic moduli of the cortical brain, and with an elastic modulus of approximately 5±3 kPa with shear modulus of 1.2-1.4 kPa.

In some embodiments, the method can include: obtaining a crosslinker to base curve for the crosslinker and base PDMS precursor; determining a desired elastic modulus; determining an amount of crosslinker for an amount of base PDMS precursor; and crosslinking the base PDMS with the amount of crosslinker according to the curve to obtain the desired elastic modulus for the soft conductive composition. This can be done with any amount of carbon nanotube with or without functionalization and/or with or without an associated bioactive component.

In some embodiments, the method can include making the surface of the soft conductive composition hydrophilic. In some aspects, the method can include coating the surface of the soft conductive composition with a hydrophilic coating.

In some aspects, the method can include removing an unreacted crosslinker from the soft conductive composition.

In some embodiments, a method of measuring properties at a tissue interface can include: providing a device having the soft conductive composition; implanting the device having the soft conductive composition at a tissue interface; and measuring a property with the device. In some aspects, the method can include measuring the stability of electrochemical impedance. In some aspects, the method can include performing neural recordings. In some aspects, the method can include incising dura for implantation of the device. In some aspects, the method can include placing gelfoam over the device after implantation. In some aspects, the method can include implanting into a neural interface of the brain. In some aspects, the method can include securing the device onto the skull. In some aspects, the method can include securing the device onto the skull with dental cement (PMMA). In some aspects, the method can include performing electrochemical impedance spectroscopy with the device configured as a neural probe. In some aspects, the method can include performing neural recordings with the neural probe.

In some embodiments, an implant for a tissue can include: an implant having a surface, and a crosslinked silicone composition on the surface and having a first elastic modulus adapted to be implanted into a tissue having the first elastic modulus or +/−1%, 5%, 10%, 20%, or 50% thereof, wherein the degree of first elastic modulus is determined by a ratio of crosslinker and base (e.g., silicone reagent). In some aspects, the surface is polymeric, ceramic, or metal.

In some embodiments, a method of making a tissue compatible with implantable composition can include: selecting a tissue to receive the implant; determining an elastic modulus of the tissue; selecting PDMS precursors; and cross-linking the PDMS precursor to obtain the elastic modulus of the tissue or +/−1%, 5%, 10%, 20%, or 50% to obtain the tissue compatible implantable composition. In some aspects, the method can include determining a ratio of crosslinker and PDMS precursor to obtain crosslinking that results in the elastic modulus. In some aspects, the method can include selecting the carbon nanotubes, and introducing the carbon nanotubes into the crosslinked PDMS to form a soft conductive composite composition. In some aspects, coating the tissue compatible implantable composition onto an implantable medical device.

Figure 1B:
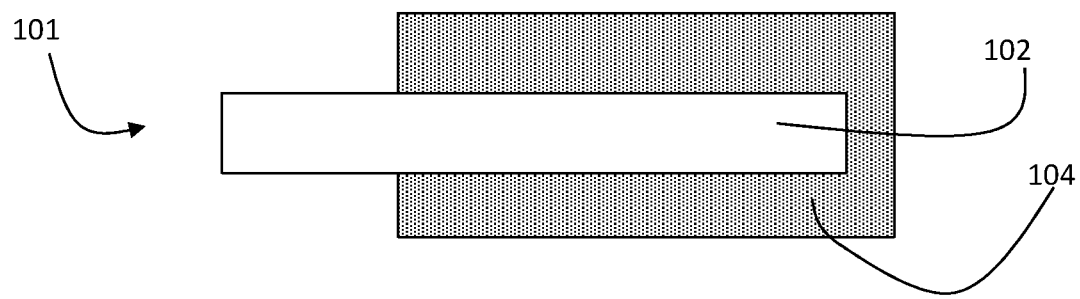
FIG. 1B shows a schematic representation of an implant having an implant substrate and a soft conductive material partially encapsulating an end of the implant.
Figure 1C:
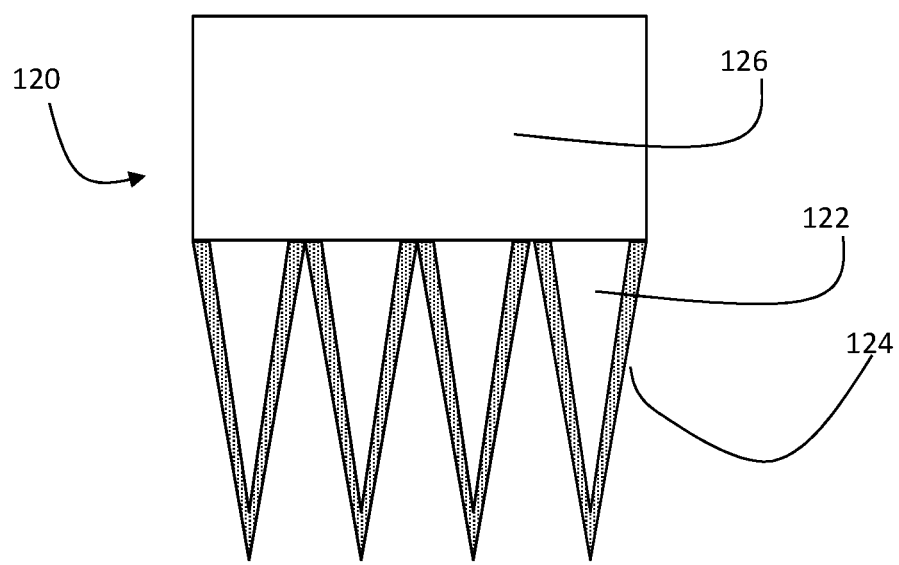
FIG. 1C shows a schematic representation of a device having a plurality of implantable substrates and a soft conductive material covering the implantable portion of implantable substrates, and a non-implantable portion devoid of the soft conducive material.

The devices described herein can be provided in various configurations. FIGS. 1A-1C are provided as generic examples that can be applied to most devices, such as those described herein.

FIG. 1A shows a schematic representation of an implant 100 having an implant substrate 102 and a soft conductive material 104 encapsulating the implant 100. The soft conductive material 104 can be configured as described herein with the carbon nanotubes or other conductive member and with the bioactive component. The substrate 102 can be a hard material, such as a hard polymer (e.g., plastic), metal, ceramic, composite, combinations thereof, as well as other hard materials used in implants. Examples of the substrates can include titanium probes and carbon fibers.

FIG. 1B shows a schematic representation of an implant 101 having an implant substrate 102 and a soft conductive material 104 partially encapsulating an end of the implant 100. Here, a portion of the implant substrate 102 is devoid of the soft conductive material 104.

FIG. 1C shows a schematic representation of a device 120 having a plurality of implantable substrates 122 and a soft conductive material 124 covering the implantable portion of implantable substrates 122, and a non-implantable portion 126 devoid of the soft conducive material.

Figure 2:
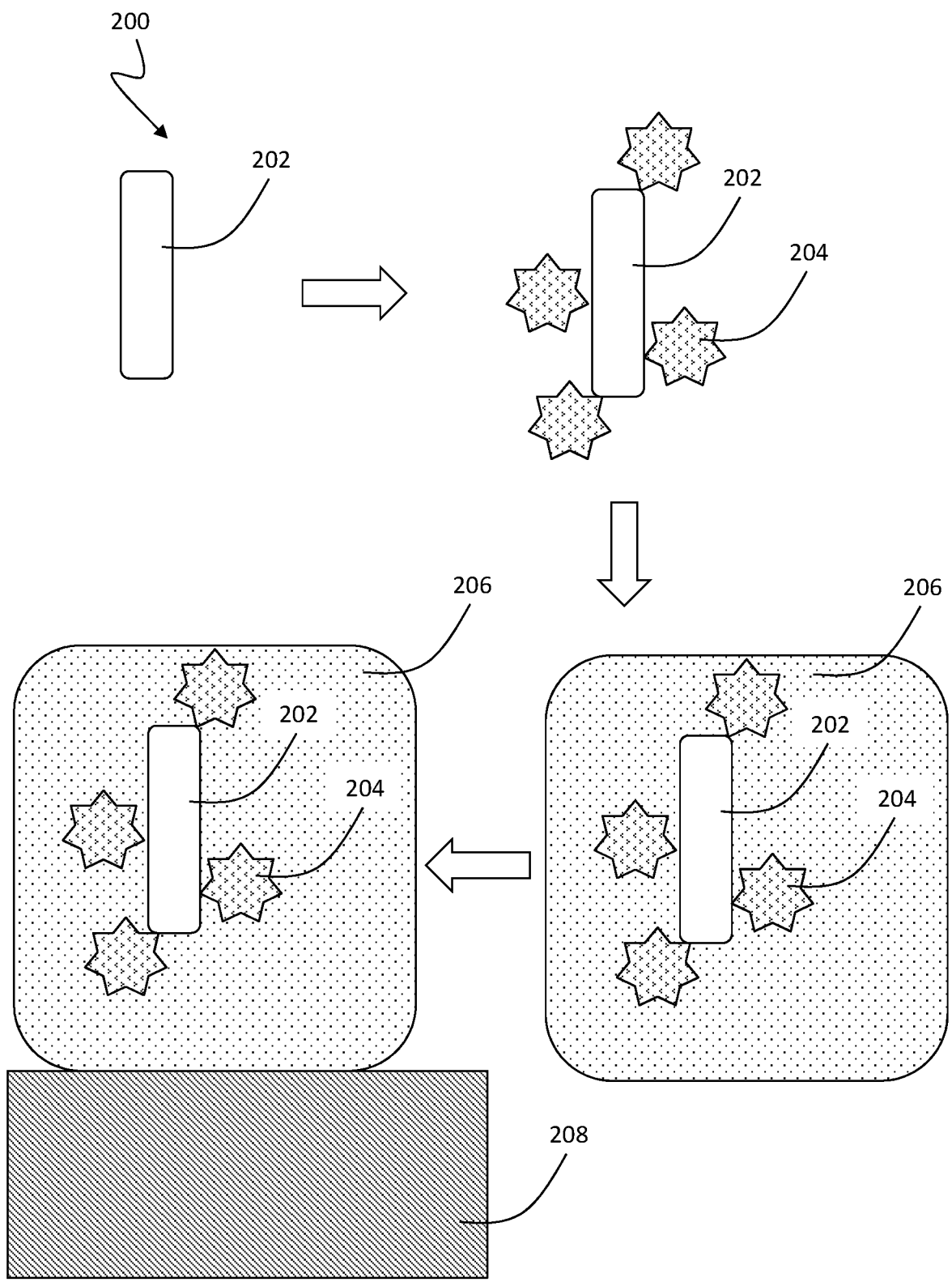
FIG. 2 shows a schematic representation of a process for preparing the soft conductive composition.

FIG. 2 shows a schematic representation of the process 200 for preparing the soft conductive composition. Step (A) includes providing a CNT 202. Step (B) includes adsorbing a bioactive component 204 onto the CNT 202. Step (C) includes combining the CNT 202 having the bioactive component 204 with a conductive matrix 206. Step (D) includes attaching the conductive matrix 206 containing the CNT 202 having the bioactive component 204 onto a substrate 208 (e.g., carbon fiber, metal, ceramic, composite, plastic, etc.). It should be clear that the substrate 208 can include the conductive matrix on a surface, or partially encapsulating (e.g., FIG. 1B), or fully encapsulating the substrate (FIG. 1A).

In an example, tyrosinase (e.g., bioactive component 204) is physically absorbed onto multi-walled carbon nanotubes (CNT 202), and embedded in the conductive silicone matrix 206 using a fast heat curing process, and located onto bundled carbon fibers (substrate 208) having about 100 µm final thickness. In controls described herein, the biosensor was fabricated without the conductive silicone matrix 206.

The soft materials can improve the biocompatibility of neural interface devices by reducing glial scarring and associated immune reactions. In addition, the soft material can reduce interfacial, mechanical strain at implant sites. The soft interfacial material can be configured to be brain-like in its mechanical properties and assess the stability of electro-chemical impedance at the interface. Suitable exemplary implants can include neural probes coated with the soft material. A soft and conductive composite (~5 kPa elastic modulus) can include silicone derivatives and single-walled or multi-walled carbon nanotubes for conductivity. Tungsten microelectrodes can be coated with the soft silicone composite. Also, Pt/Ir microelectrodes can be coated with the soft silicone composite and implanted for durations ranging from 5 weeks to over 1 year. Electrochemical impedance spectroscopy can be used to assess the quality of the brain-tissue-electrode interface under chronic conditions. Neural recordings were assessed for unit activity, signal-to-noise ratio (SNR), and noise levels for over 1 year of implantation in rodents. The data shows that the soft conductive composite can be useful for an extended duration.

In some embodiments, the present invention provides a device that includes the soft, compliant interface conductive composition that is engineered to match target tissue material properties. The conductive composition can also be functionalized with biorecognition elements (e.g., bioactive components that act with biological substances) for in vivo implantable electrochemical applications. The conductive composition is a material that displays stable electrical properties over long-term implantation conditions. The electrical properties can be tunable via manipulation of the amount of carbon nanotubes in the filler. Also, the amount of bioactive component loaded onto the carbon nanotubes can be optimized to achieve selective and specific responses for chronic, in vivo applications. The conductive composition is scalable over a wide range from nanoscale to higher dimensions, and therefore applicable for a wide variety of on-body and in-body sensors.

In some embodiments, the conductive composition includes a matrix of a soft silicone material fabricated from PDMS precursors (e.g., Sylgard 184 elastomer kit, Dow Corning) that has been matched to the mechanical properties of brain tissue or any other organ-tissue of choice in vivo. The matrix includes functionalized carbon nanotubes (e.g., multi-walled carbon nanotubes (e.g., MWCNTs-COOH) for enhanced conductivity. The MWCNTs (e.g., ~5-8 nm length) can be treated with concentrated nitric acid to create MWCNTs-COOH (e.g., carboxylic acid functionalized) and create a conductive, brain-like material. The matrix can be useful as an electrochemical sensor by physically adsorbing an enzyme (e.g., tyrosinase) or other bioactive component onto MWCNTs (e.g., functionalized and/or non-functionalized). Such a conductive composition can be used as an amperometric sensor. This technology is scalable from nanoscale dimensions to higher dimensions and therefore applicable for a wide variety of on-body and in-body sensors.

In an example of making the conductive composition, tyrosinase was dissolved in 0.1 M phosphate buffer solution (PBS) and subsequently diluted to 2 mg/ml, and physically adsorbed to non-functionalized MWCNTs. Here, the tyrosinase solution was mixed with 0.5 mg MWCNTs and allowed to dry overnight. Once dried, the bioactive component coated MWCNTs were mixed thoroughly in the PDMS precursors with or without functionalized MWCNTs, and then coated over a ~100 µm diameter carbon fiber. Once coated, the carbon fiber was placed over (e.g., about ~2 mm above) a hot plate (150° C.) for 3 min and submerged in deionized water for 3 hours. This fast cure process preserved the elastic modulus to a near brain-like (5-10 kPa) level and preserved the functionality of the enzyme without degradation as tested by various electrochemical methods (e.g., cyclic voltammetry, impedance spectroscopy, chronoamperometry). The protocol can be tailored to obtain elastic modulus for other target tissues. Following the submersion in water, the carbon fibers were stored in ACSF at 4° C. for passivation and subsequent storage for at least 24 hours.

The matrix can be treated with various simulated physiological mediums (e.g., ACSF, ACSF+protein, ACSF+$H_2O_2$, saline, etc.). The treated matrix can be more stable than the conventional biosensor (e.g., physically adsorbed carbon fiber with no MWCNTs or soft coating). It was found that the soft, modified coating material was functional and sensitive to tyrosinase substrate (e.g., L-tyrosine ester) and was sensitive in the physiological range (e.g., 50-20 mM).

The conductive composition can maintain performance characteristics for up to a year or longer due to the avoidance of progressive immune and inflammatory response. The mechanically matched conducive composition can avoid slow build-up of scar tissue and thereby avoid encapsulation impedes of device function. The conductive composition can avoid biofouling and interference from multiple analytes within the same micro-environment. The conductive composition provides a soft, conductive silicone based interface that has stable electrical characteristics for at least 1 year in vivo. The enzyme adsorbed onto carbon nanotubes and embedded in the soft, conductive silicone material can be used for neural (e.g., both central and peripheral nervous system) and other tissue interfaces, and thereby provide an effective electrochemical sensor to detect physiological levels of analyte with a stable response.

The conductive composition can be used as a coating to coat any electrode system of choice (e.g., tungsten, carbon fiber, gold, platinum, platinum/iridium alloys, stainless steel or other). The conductive composition does not degrade with time, and thereby impedance characteristics remain stable for at least 1 year in vivo. In addition, the material has been found to be histologically more stable than hard materials. The conductive composition does not swell due to water uptake like hydrogels, which can swell upwards of 200%. Off-the-shelf PDMS is still mechanically mismatched and can cause immune reactivity due to induced strain, whereas the conductive composition is mechanically matched to a target tissue, enabling it to absorb dynamic micromotion induced stresses and tissue strain via its compliant characteristics.

The conductive composition is functionalized with enzymes or other bioactive components to realize a new class of products (e.g., electrochemical sensors and devices), and it has been found to be stable in various simulated physiological mediums with minimal response degradation.

The methodology of incorporating bioactive components using physically adsorbed carbon nanotubes and embedding in a conductive silicone medium is not intuitive since biological components may denature in organic, hydrophobic materials. However because of the unique material fabrication process, biological components have been shown to be stable and the material can be tailored to custom applications for in vivo, implantable biosensors. This conductive material may be also be functionalized with peptides or other bioactive components as listed herein that are suitable for application.

The conductive composition can be used for electrochemical sensors utilizing amperometry and voltage-based methods such as fast cyclic voltammetry in order to perform real-time characterization of synaptic function in deep brain neural circuits in vivo with fast response times and high sensitivity. The conductive composition overcomes significant limitations for use in vivo due to challenges with selectivity, interference, biofouling, sensor degradation & instability under long-term implantation conditions. The soft, brain-like, conductive silicone has stable electrochemical impedances, and is capable of recording single units over one year in a rodent model. Additionally, the embedded tyrosinase (a dopamine-sensitive enzyme) within the soft silicone based scaffold provides enzyme-based amperometric detection capability and stability.

Experimental

Electrochemical experiments were conducted at 37° C. using a 3-electrode system with platinum ground and Ag/AgCl as reference. Amperograms were obtained with L-tyrosine methyl ester as a substrate with concentrations of 0-20 mM (corresponding to physiological concentrations) in various mediums. Cyclic voltammetry (CV) was used to assess functionality and stability of the biosensor using intermittent (storage) or continuous cycling (~100 cycles) for operational stability.

Figure 3:
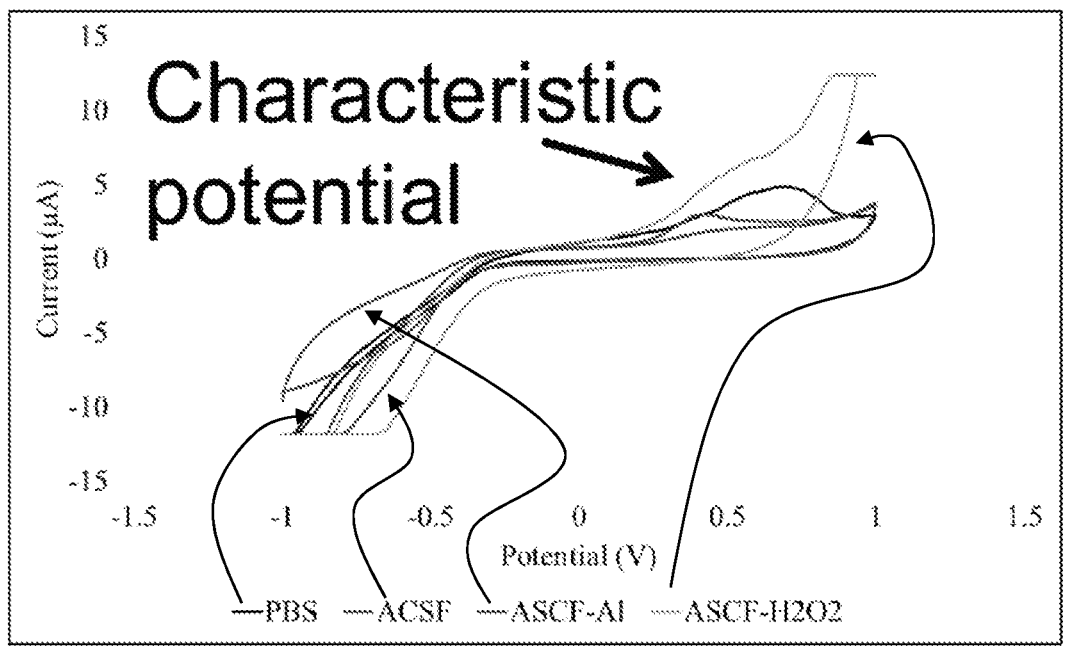
FIG. 3 shows characteristic potential in current versus potential in the following media: PBS, ACSF, ACSF-Al, and ACSF-$H_2O_2$.

FIG. 3 shows characteristic potential in current (e.g., μA) versus potential (V) for PBS (e.g., isotonic buffer to mimic ion concentration, osmolarity, and pH of human body fluids), ACSF (e.g., cerebrospinal fluid), ACSF-Al (e.g., Al is albumin at 50 mg/ml, which simulates the blood-brain-barrier breach), and ACSF-$H_2O_2$ (e.g., 10-20 mM hydrogen peroxide, which simulates oxidative stress). Data (not shown) for the enzyme/CNT with carbon fiber biosensor and soft scaffold without an enzyme biosensor show there is not much difference between environments, and followed the trends of FIG. 3. Accordingly, FIG. 3 shows the cyclic voltammetry (CV) of carbon fiber electrodes with carbon fiber with tyrosinase enzyme embedded in a soft, silicone scaffold in the various simulated physiological mediums. The CVs were performed at a scan rate of 100 mV/sec in the presence of a tyrosinase substrate (0.05 mM (final concentration) L-Tyrosine methyl ester, Sigma). The typical oxidation peak between 0.47-0.6 V is observed in all mediums, whereas the lack of enzyme in controls showed no peaks (data not shown). The physically adsorbed biosensor showed peaks only in 2 of the 4 media. Table 2 shows

|  | Physically Adsorbed Biosensor (μC) | Silicone Scaffold (μC) | No Enzyme, Plain Carbon Fiber (μC) |
|---|---|---|---|
| PBS | 2.26 | 3.29 | 1.90 |
| ACSF | 3.51 | 3.25 | 1.47 |
| ACSF-Al | 7.02 | 3.71 | 2.7 |
| ACSF-$H_2O_2$ | 1.59 | 6.20 | 2.07 |

Figure 4:
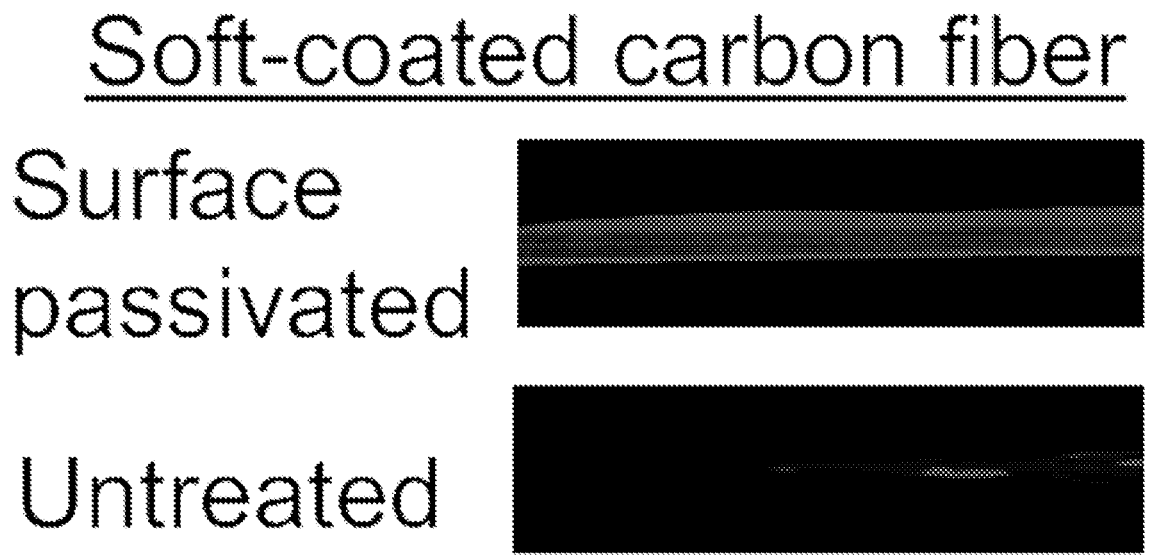
FIG. 4 shows the soft-coated carbon fiber with surface passivation and without surface passivation (untreated).

FIG. 4 shows the soft-coated carbon fiber with surface passivation and without surface passivation (untreated). The surface treatment is shown to minimize biofouling and prevents leaching of fluorescent dye in the simulated BBB medium. Accordingly, surface passivation keeps a significantly higher amount of the fluorescent dye compared to the untreated carbon fiber. The surface passivated carbon fiber shows the fluorescent dye along the body, where the untreated shows the fluorescent dye has escaped.

Figure 5A:
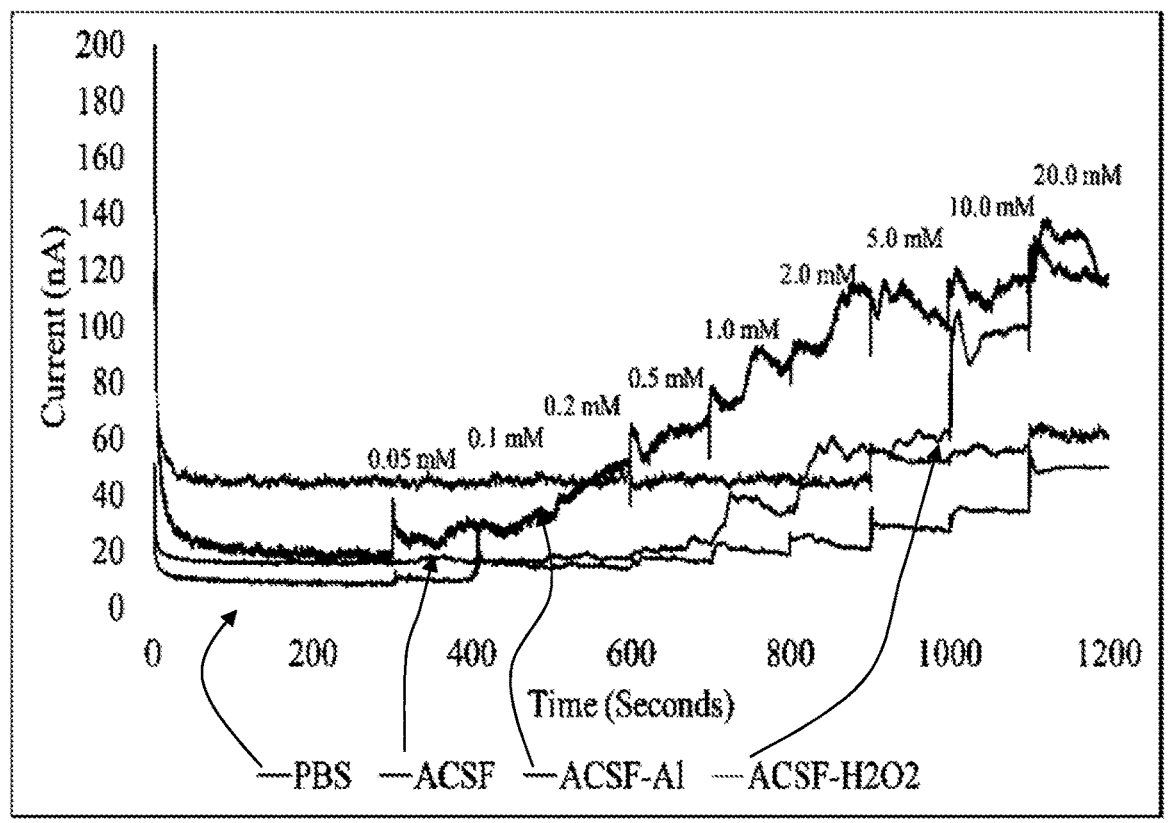
FIG. 5A shows a graph of the control biosensor (e.g., without soft conductive composition) with current versus time.
Figure 5B:
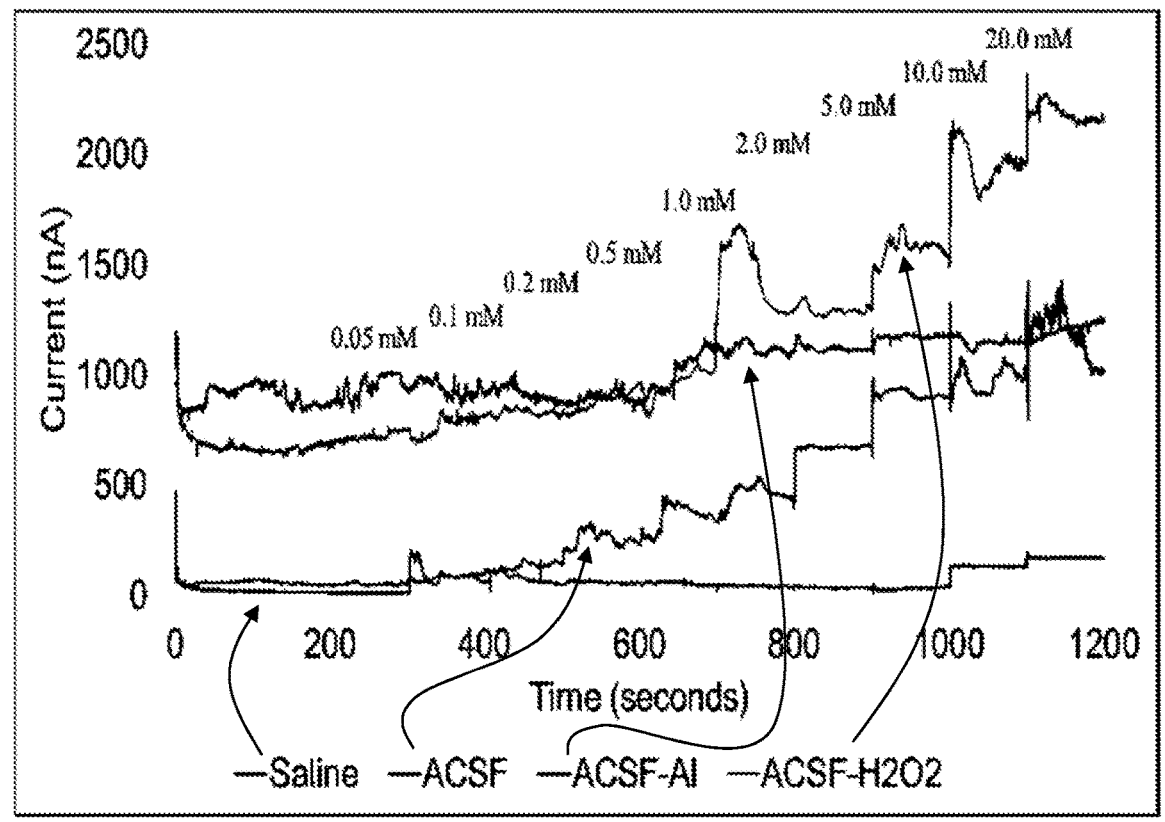
FIG. 5B shows a graph of the soft-coated biosensor with current versus time.

FIG. 5A shows the control biosensor (e.g., physically adsorbed carbon fiber-based biosensor) with current (nA) versus time (seconds). FIG. 5B shows the soft-coated biosensor (e.g., silicone scaffold, carbon fiber based biosensor) with current (nA) versus time (seconds). The data shows soft-embedded enzyme biosensor functionality in different biological mediums. The soft, embedded biosensors show increased dynamic range with lower detection limits compared to controls in amperometry tests. For controls with no enzymes, there was no detectable change in current, while soft scaffolds with enzymes had more stable current response. Accordingly, FIGS. 5A-5B show the amperometric dosage response at taken 0.6V of (FIG. 5A) physically adsorbed carbon fiber-based biosensor (n=3 biosensors) and (FIG. 5B) silicone scaffold, carbon fiber based biosensor (n=3 biosensors) from 0-20 mM substrate concentration. The black bar at the bottom of each graph indicates typical physiological range for dopamine based sensors. The physically adsorbed carbon fiber-based biosensor in (FIG. 5A) saturates faster than (FIG. 5B) silicone scaffold, carbon fiber based biosensor. The linearity of the response in the physiological range (up to 7 mM) is better with enzymes embedded in silicone scaffolds in 3 of 4 media.

Figure 6A:
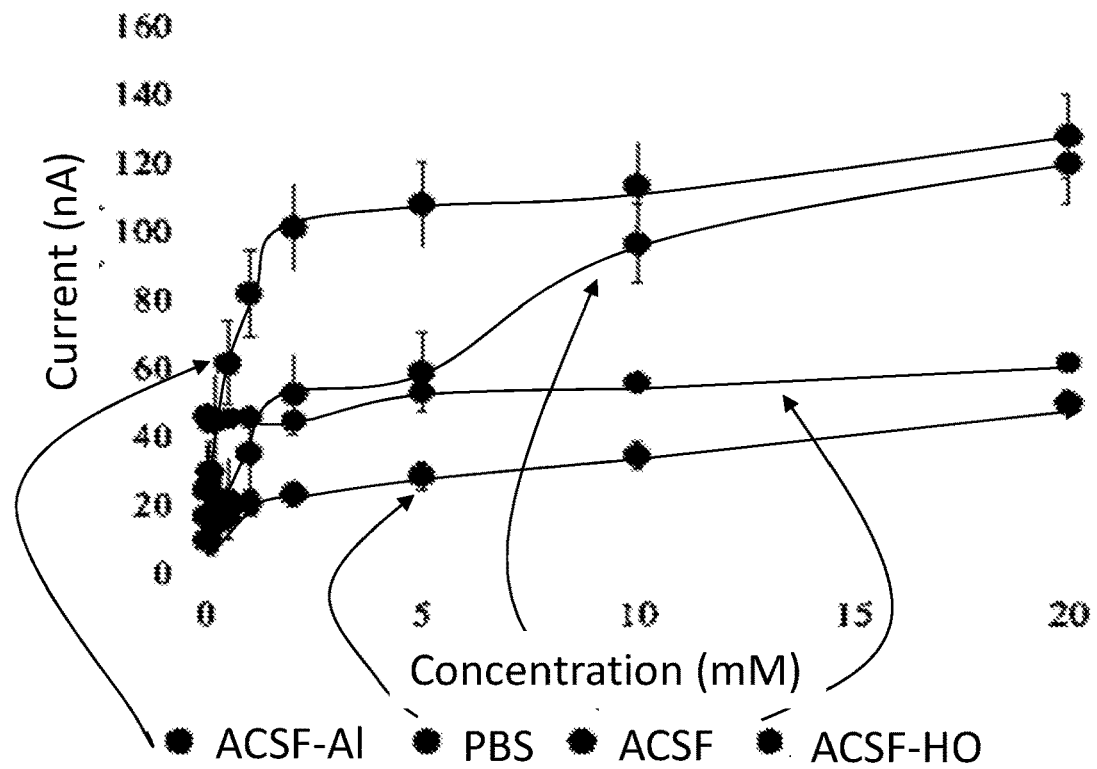
FIG. 6A shows the current for the soft biosensor in ACSF-Al, PBS, ACSF, and ACSF-HO ($H_2O_2$) versus increasing substrate concentration.
Figure 6B:
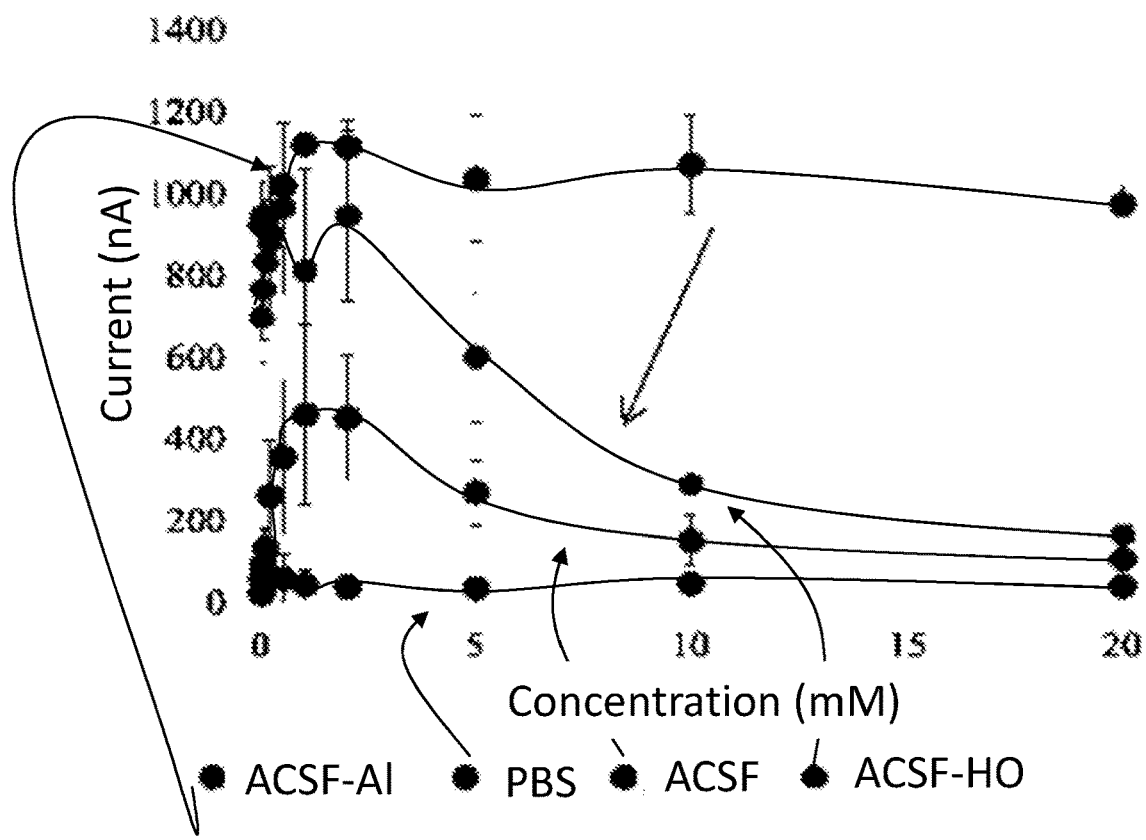
FIG. 6B shows the current for the control biosensor in ACSF-Al, PBS, ACSF, and ACSF-HO ($H_2O_2$) versus increasing substrate concentration.

FIG. 6A shows the current (nA) for the soft biosensor in ACSF-Al, PBS, ACSF, and ACSF-HO (e.g., ACSF-$H_2O_2$) versus increasing substrate concentration (mM). FIG. 6B shows the current (nA) for the control in ACSF-Al, PBS, ACSF, and ACSF-HO (e.g., ACSF-$H_2O_2$) versus increasing substrate concentration (mM). The data shows that increasing substrate concentrations show linearly increasing current responses for 3 of 4 simulation mediums for soft interfaces. Soft biosensors show stability, while controls show response degradation in 3 of 4 mediums.

Table 3 shows that albumin enhances sensitivity by synergistically passivating surface. The data suggests that albumin stabilizes enzyme based sensor activity. In this case it stabilizes enzyme synergistically with silicone scaffold improving the sensitivity by double. The linear response is not great for physically adsorbed sensors in different types of media (PBS, $H_2O_2$). The R correlation in Table 4 is for the silicone scaffold biosensor.

TABLE 3

|  | Silicone Scaffold Biosensor (nA/mM) | Physically Adsorbed Biosensor (nA/mM) |
|---|---|---|
| PBS | 6.08 | −13.6 |
| ACSF | 18.58 | 194.06 |
| ACSF-Al | 39.17 | 113.54 |
| ACSF-$H_2O_2$ | 0.29 | 74.66 |

TABLE 4

|  | Silicone Scaffold Biosensor | Physically Adsorbed Biosensor |
|---|---|---|
| PBS | 0.79 | 0.16 |
| ACSF | 0.99 | 0.70 |

TABLE 4-continued

| | Silicone Scaffold Biosensor | Physically Adsorbed Biosensor |
|---|---|---|
| ACSF-Al | 0.91 | 0.77 |
| ACSF-$H_2O_2$ | 0.11 | 0.32 |

These tables show information regarding FIGS. 6A and 6B, such as the slope. FIGS. 6A-6B shows how varying concentration can provide a calibration curve in the physiological range. The slope of Table 3 provides the indication of sensitivity where a steeper slope is more sensitive and a less steep slope is less sensitive. So, while there can be increased stability with the soft conductive matrix, there is less sensitivity with the soft conductive matrix. Table 4 shows how predictable the correlation to sensitivity can be, such as in the physiological range (e.g., far left side). So, the slope is being calculated by 0-2 mM, where there are straight lines as captured in Tables 3-4. The higher R correlation the higher the linearity of the slope.

Figure 7A:
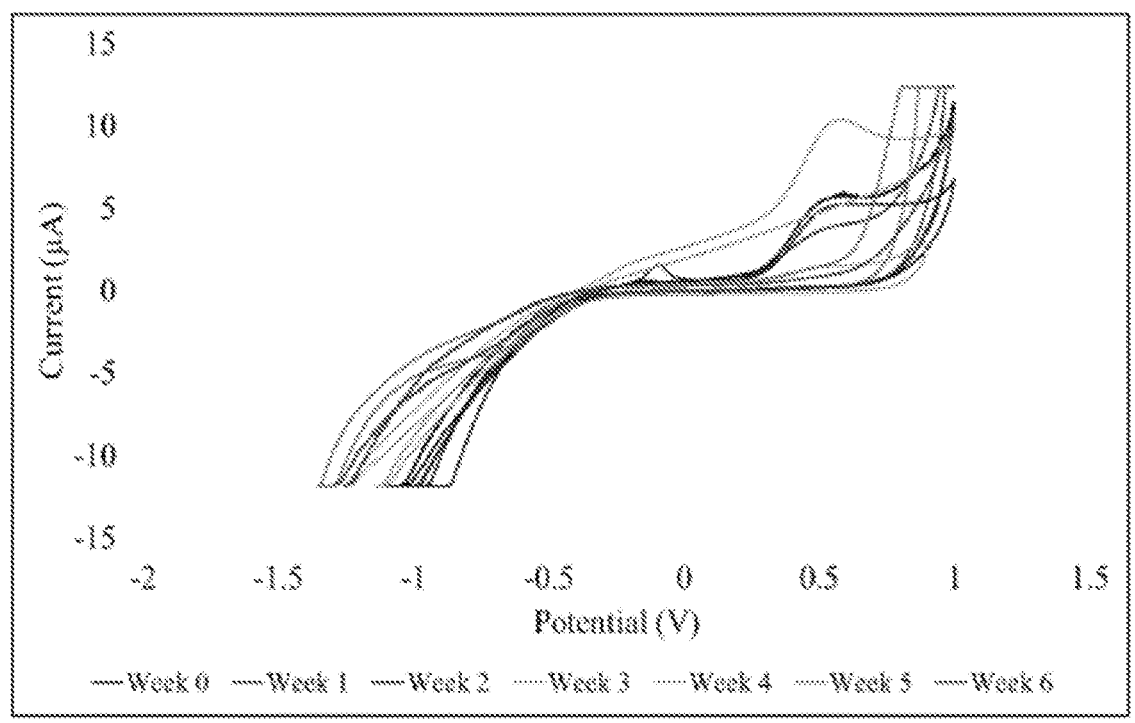
FIG. 7A shows the storage stability with current versus potential for 6 weeks.

FIG. 7A shows the storage stability with current (µA) versus potential (V) for 6 weeks. This shows similar stability over the time range. As such, FIG. 7A shows the storage stability was obtained over a 6-week period using cyclic voltammograms (CVs). For each CV, the enzyme embedded in silicone scaffold on a carbon fiber electrochemical sensor was exposed to 0.05 mM (final) of L-Tyrosine methyl ester in aCSF at a scan rate of 100 mV. This oxidation peak was observable for 6 weeks with a decrease in oxidation peak currents (~38%) after 6 weeks when stored at room temperature at 25° C. As shown, the general trend is similar for the duration of up to 6 weeks. Some weeks show a peak in the potential of 0.5 V (e.g., large peak at week 3, smaller peaks at weeks 0, 1, and 2).

Figure 7B:
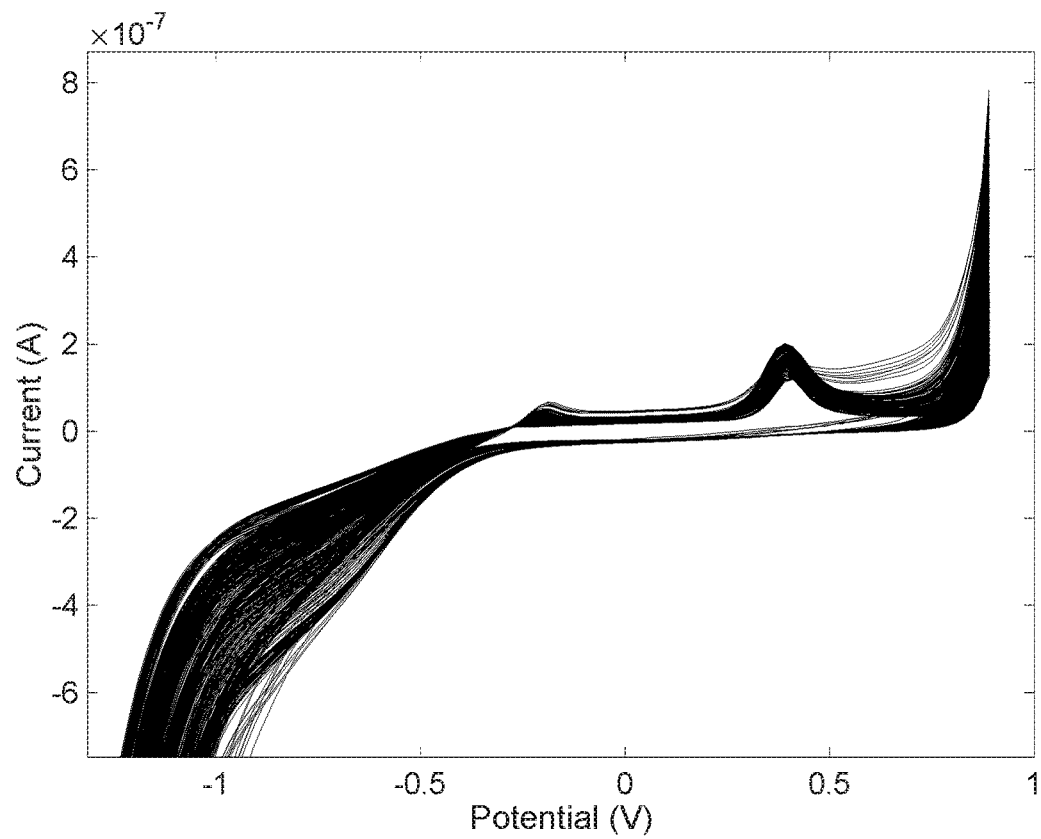
FIG. 7B shows the operational stability of the enzyme embedded in silicone scaffold on a carbon fiber was obtained for 350 cycles over ~8 hours using cyclic voltammograms.

FIG. 7B shows the operational stability of the enzyme embedded in silicone scaffold on a carbon fiber was obtained for 350 cycles (−1 V to 1 V) over ~8 hours using cyclic voltammograms (CVs). For each cycle, the electrochemical sensor was exposed to 0.05 mM (final) of L-Tyrosine methyl ester in aCSF at a scan rate of 100 mV/s at 25° C.

As such, FIG. 7A shows that the electrode coated with the soft conductive matrix can be repeatedly used and then stored over a large number of uses. Then, FIG. 7B shows that the electrode coated with the soft conductive matrix can be continuously used over a large number of cycles (e.g., without intermittently being stored as in FIG. 7A).

When comparing FIGS. 7A and 7B, the sensor is shown to be stable over 6 weeks when used intermittently and stored intermittently (FIG. 7A), and shows stability when continuously used over a large number of cycles (FIG. 7B). FIG. 7B shows a trace for each cycle of use, which shows that each cycle is similar to the other cycles with the similar trends and peaks. So, FIG. 7A can show shelf stability where it can be used intermittently, and FIG. 7B shows use stability when continuously used.

Figure 7C:
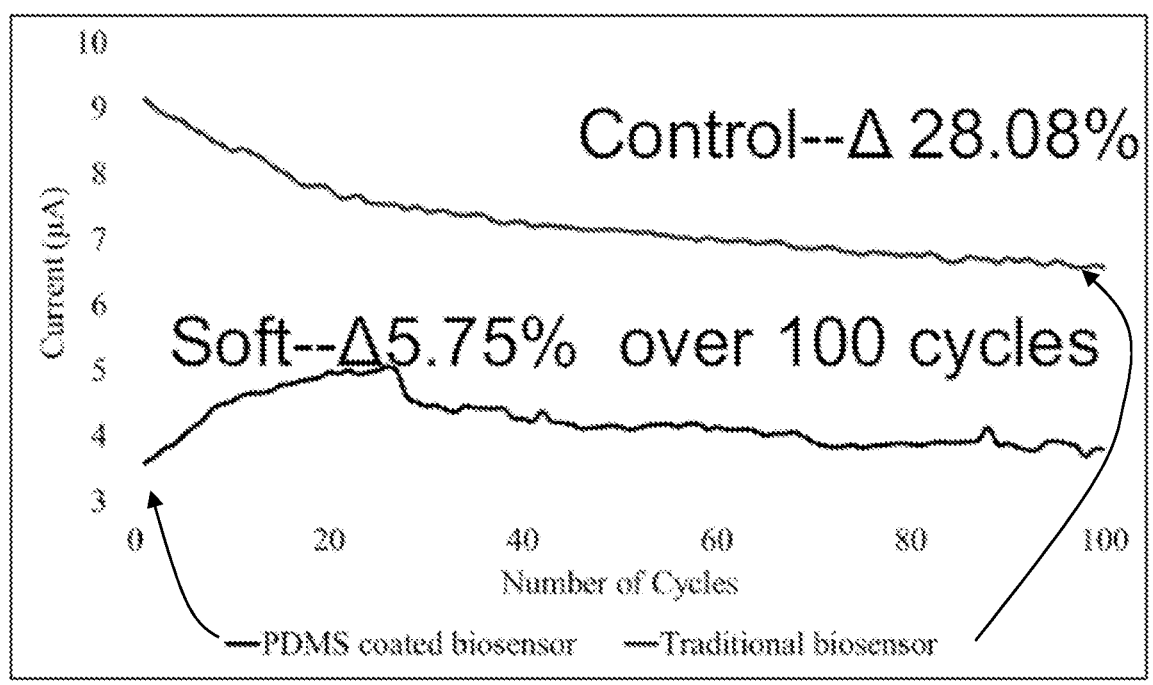
FIG. 7C shows operational stability for the PDMS coated biosensor compared to a traditional control biosensor for current versus number of cycles.

Additionally, FIG. 7C shows operational stability for the PDMS coated biosensor compared to a traditional control biosensor for current (µA) versus number of cycles. This shows the PDMS coated biosensor has a more constant current over cycles, whereas the control degrades over cycles. Additionally, operational stability of the enzyme embedded in silicone scaffold on a carbon fiber was obtained for 350 cycles (−1 V to 1 V) over ~8 hours using cyclic voltammograms (CVs). For each CV, the electrochemical sensor was exposed to 0.05 mM (final) of L-Tyrosine methyl ester in aCSF at a scan rate of 100 mV/s at 25° C.

Accelerated biofouling tests were performed with a simulated blood-brain barrier (BBB) breakdown challenge using albumin concentration (50 mg/ml) as acceleration factor for 3 days.

In vitro uniaxial stretch assays were performed. Thin strips of PDMS (4.5 cm length, ~100-120 µm thickness) with either hard (elastic modulus, 1-3 MPa) or soft (elastic modulus, 5-10 kPa) coatings were seeded with primary cortical neurons (rat E18, Brainbits™) and cultivated for 4-5 days in NBActiv™ medium. Neuron-seeded membranes were then uniaxially stretched in a custom-built, cyclic mechanism at 0.2 Hz, 3% strain for 4-5 hours to mimic tissue micromotion due to respiration and assayed for mitochondrial activity using Mitotracker CMXRos™. It was found that increasing mitochondrial activity corresponds to (a) cyclic strain simulating micromotion and (b) varying deformation levels due substrate mechanical properties. Also, neurons cultured on hard substrates have higher mitochondrial activity compared to unstretched controls with increasing strain rates. Stable mitochondrial activity (independent of strain rates in the substrate) was observed in neurons cultured on soft surfaces compared with those in neurons cultured on hard substrates.

In vivo histological profile of hard/soft coatings were performed. All animal experiments were done in accordance with ASU-IACUC. A mouse (C57B16) was implanted with a hard silicone (E~1-3 MPa) or brain-like, soft silicone (E~5-10 kPa) coated carbon fibers. Histological assessments were performed using various stains/antibodies after 8 weeks, see Table 5.

TABLE 5

| Stain/Antibody (ab) | Biomarker |
|---|---|
| IgG (ab) | BBB integrity |
| Iba-1 (ab) | Microglia |
| GFAP (ab) | Reactive Astrocytes |
| MAP2 (ab) | Neuron Dendrites |
| Neurofilament (ab) | Neuron axon |
| Tau (ab) | Neuron axon |
| Tubulin III (ab) | Neuron cytoskeleton |
| Hematoxylin/Eosin | Cell Nuclei |
| Cresyl Violet | Nissl Bodies |
| Janus Green (JG-B) | Mitochondria/pH |

Figure 8:
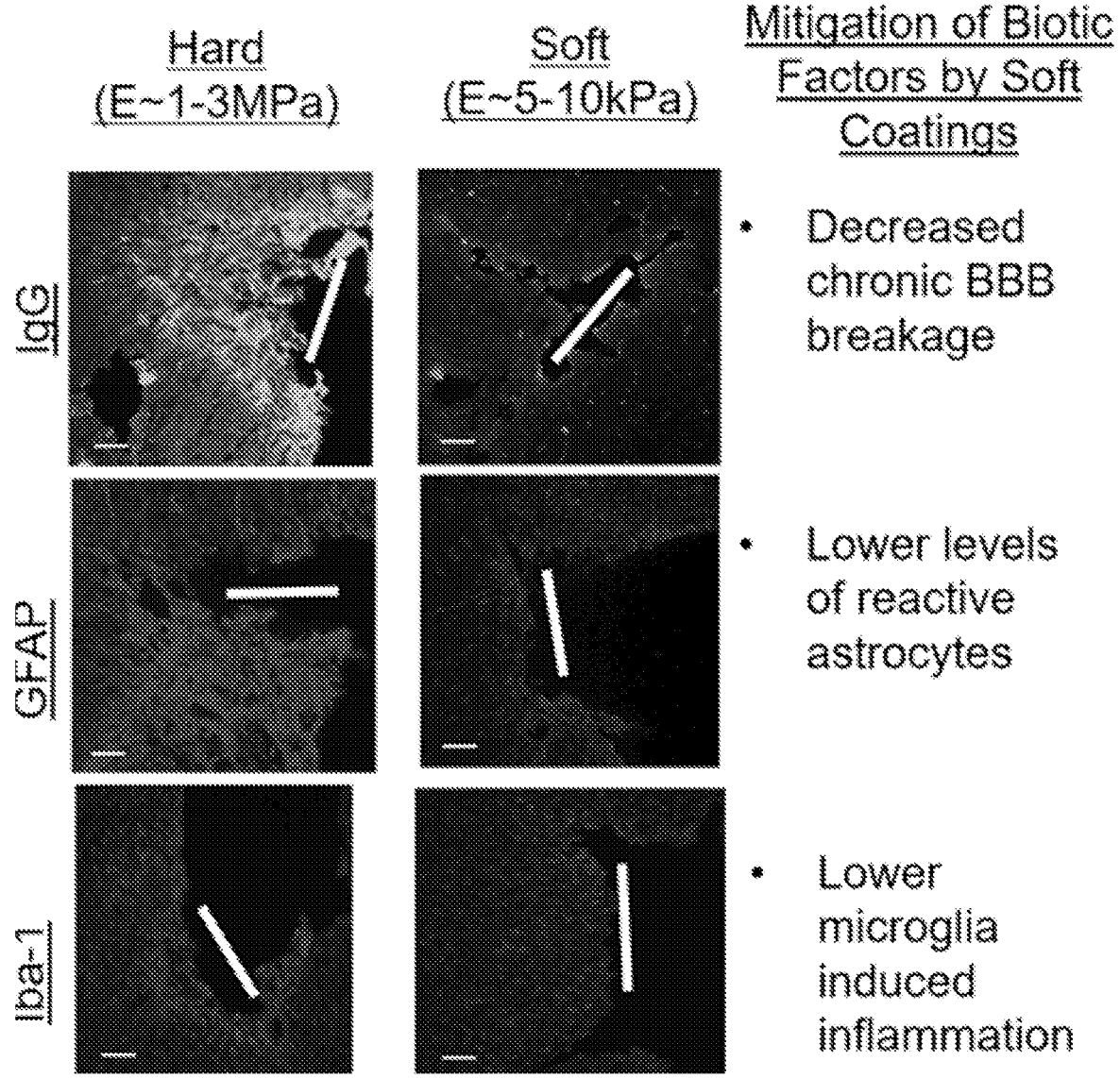
FIG. 8 shows histology of hard coated (E~1 MPa) and soft-coated (E~5-10 kPa) electrodes implanted 8 weeks in a mouse model.

FIG. 8 shows Histology of hard coated (E~1 MPa) and Soft-coated (E~5-10 kPa) electrodes implanted 8 weeks in a mouse model. Also, the data showed that the soft conductive matrix inhibits cellular adhesion, which can be beneficial by avoiding any fouling or cellular buildup that inhibits operation. Also, inhibiting cellular adhesive can inhibit an immunological response, and thereby the soft conductive matrix inhibits the body from a negative response when implanted.

It was found that there was mitigation of biotic factors by the soft conductive composition, such as reduced disruption of the BBB, increased nissl bodies with soma straining indicative of neurons near soft interfaces, reduced activated microglia around soft interfaces, healthier neuronal and other cell populations, and lower levels of reactive astrocytes. The in vivo histology shows that soft silicone interfaces mitigate biotic failure modes in chronic implants.

Figure 9A:
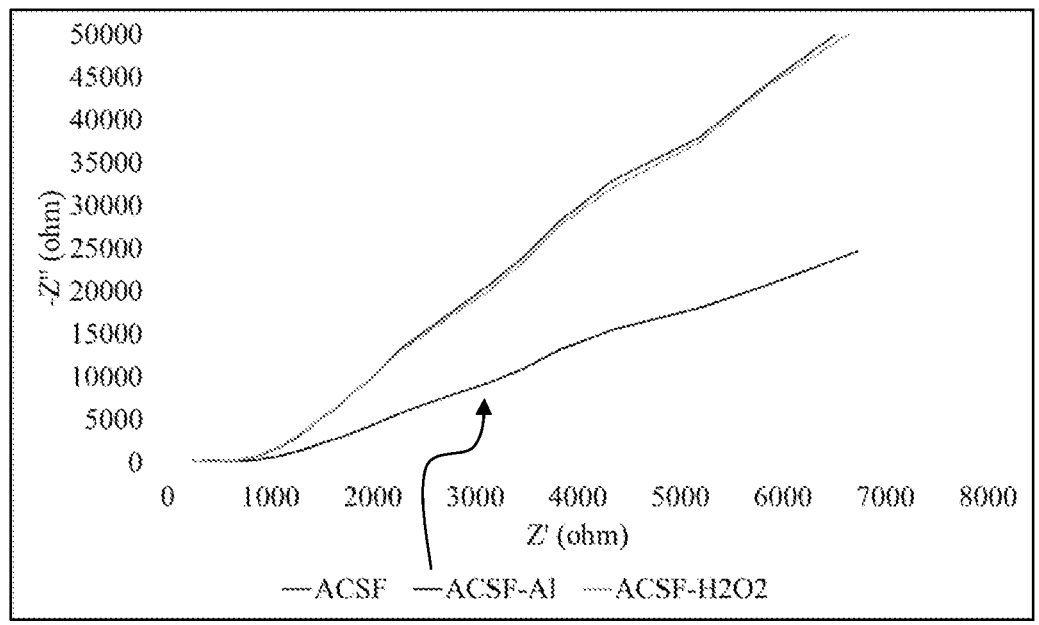
FIGS. 9A-9B show a comparison of Nyquist plots of a soft, enzyme embedded biosensor at (FIG. 9A) 0 Bias and (FIG. 9B) 0.7 V bias.
Figure 9B:
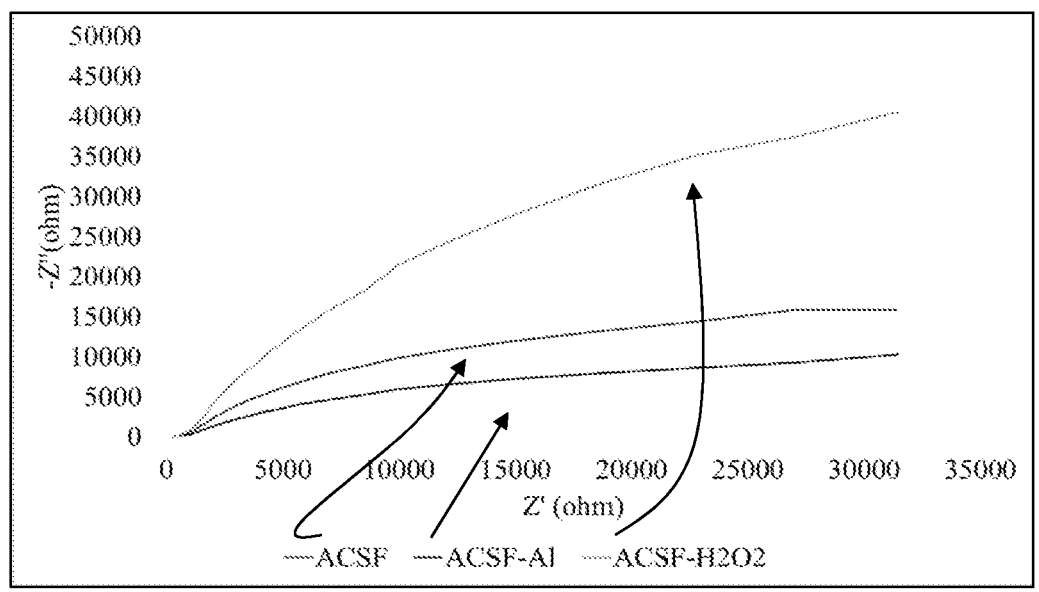

FIGS. 9A-9B show a comparison of Nyquist plots of a soft, enzyme embedded biosensor at (FIG. 9A) 0 Bias and (FIG. 9B) 0.7V bias. This shows the soft, embedded biosensors have enzyme functionality via increased charge transfer capability when reduction potential is applied to electrode.

Figure 9C:
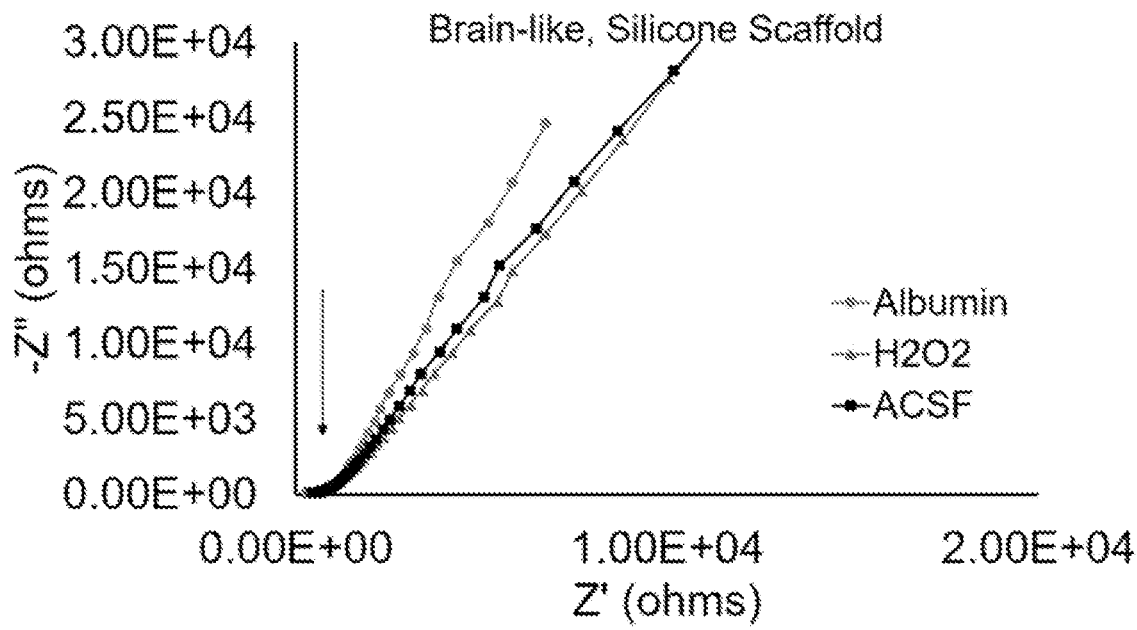
FIG. 9C shows the embodiment with embedded tyrosinase enzyme-MWCNTs in silicone scaffolds.
Figure 9D:
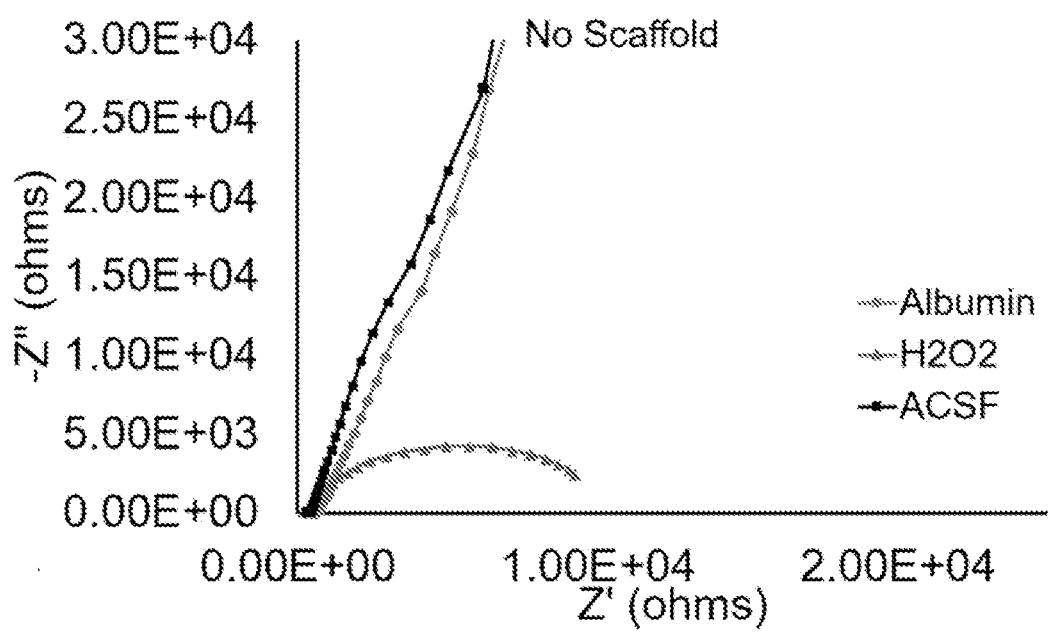
FIG. 9D shows only physically adsorbed enzyme-MWCNTs.
Figure 9E:
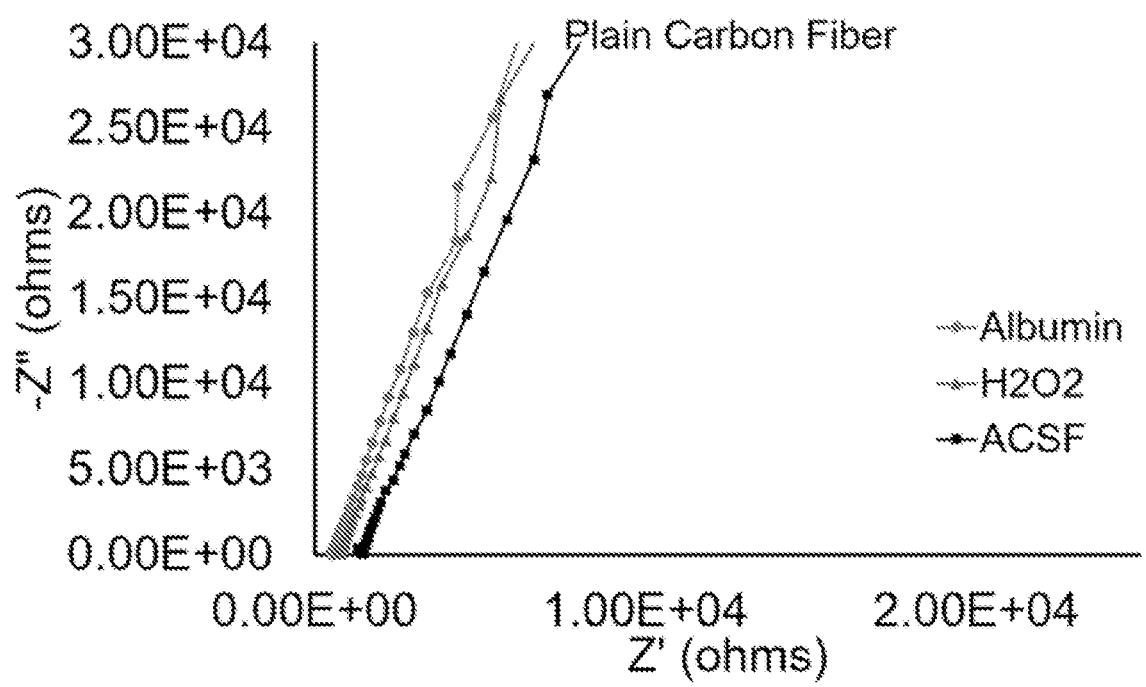
FIG. 9E shows plain carbon fiber with no enzyme or scaffold.

FIGS. 9C-9E show a comparison of electrochemical impedance spectroscopy (EIS) of carbon fibers. FIG. 9C shows the embodiment embedded tyrosinase enzyme-MWCNTs in silicone scaffolds. FIG. 9D shows only physically adsorbed enzyme-MWCNTs. FIG. 9E shows plain carbon fiber with no enzyme or scaffold. The EIS was performed at 0 bias. When unprotected by silicone scaffolds, the enzyme readily reacts with hydrogen peroxide ($H_2O_2$), changing interface properties as seen in FIG. 9C. The arrow in FIG. 9D indicates the minimization of effects from solution conductivity compared to plain carbon fiber in FIG. 9E, suggesting a passivating role in the electron transfer mechanisms between enzyme and solution.

The impedance shown in these figures show the soft conductive matrix is stable, even across the different environments, as shown in FIG. 9C. When there is no matrix to protect the probe/electrode, the environmental composition can impact effectiveness, where FIG. 9D shows that hydrogen peroxide impacts functioning of the enzyme. In the implantable devices, there can be a large amount of oxidative conditions when implanted. Accordingly, the data shows that the soft conductive matrix can protect the underlying implant by withstanding oxidative stress.

Figure 10:
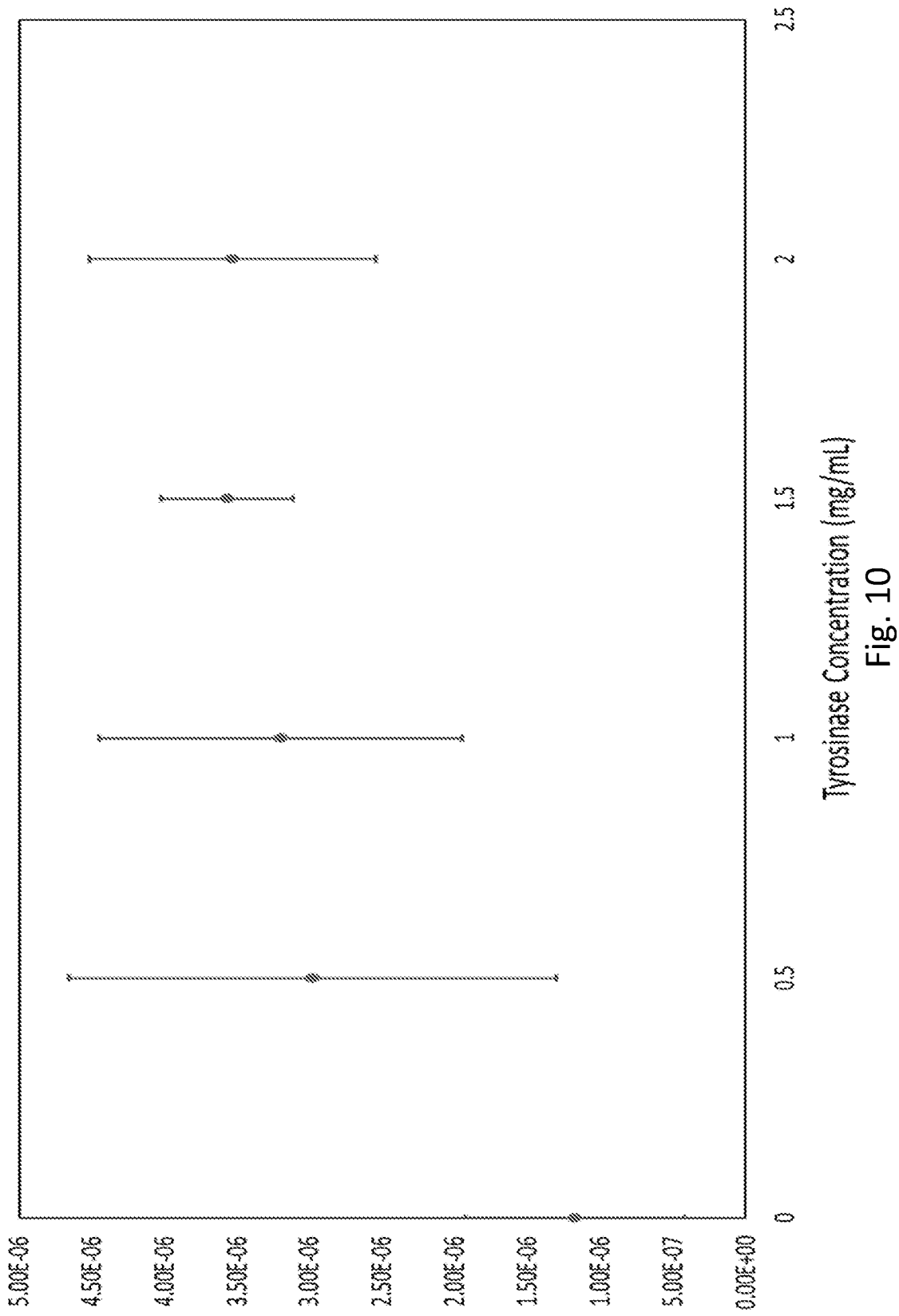
FIG. 10 includes data showing that 0.05 mg of enzyme is the minimum amount required to achieve peak redox-currents beyond which the response appears to saturate.

FIG. 10 includes data showing that 0.05 mg of Enzyme is the minimum amount required to achieve peak redox-currents beyond which the response appears to saturate. As such, the amount can be above or about 0.05 mg, to about 0.075 mg, to about 0.1 mg, to about 0.5 mg, to about 0.75 mg, or up to about 1 mg, or any range therebetween.

The number of walls in the MWCNTs can be varied. The following provides examples of the CNT types that can be used in silicone matrix: (1) Single-walled (sigma), (2) MWCNT (cheaptubes) and (3) MWCNT (Graphene supermarket). The single-walled CNTs were purchased functionalized with a carboxylic group (—COOH). The MWCNTs from cheaptubes.com were not purchased functionalized, but were then functionalized by using the following protocol: reflux of 250 mg MWCNTs in 1:1 $HNO_3$ (nitric acid): $H_2SO_4$ (sulfuric acid) at 50° C. for at least 2 hours, after which the functionalized MWCNTs were washed in deionized water 5 times, followed by acetone, 100% ethanol and vacuum dried on Whatman filter paper.

The non-functionalized CNT/Silicone mix were tested for dry electrode fabrication, as shown in the following Table 6.

TABLE 6

| CNT type | # of walls (estimated) | Approximate length | Dry Electrode Bulk Resistivity across 1 cm length cylinder (without —COOH group) 7.5% CNT: Silicone (w:w) |
| --- | --- | --- | --- |
| SWCNT in silicone | 1 | 0.5-1.5 μm | Not tested |
| MWCNT in silicone | ~4 | 10-50 μm | 2-4 kohms |
| MWCNT in silicone | ~30 | 10-15 μm | ~300 kohms |

The # of walls parameter was based on the outer dimension of the nanotube based on manufacturer's measurements.

The ratio of functionalized CNTs vs. Non-functionalized CNTs in the composition can be determined. The soft, conductive brain-like matrix included 1 mg MWCNTs-COOH per gram of soft silicone matrix pre-mix. The non-functionalized MWCNTs were used as a carrier for the tyrosinase enzyme (e.g., used for dopamine sensing). Basically, 10 mg of non-functionalized MWCNTs were adsorbed with 100 μL of 0.5, 1.0, 1.5 and 2.0 mg/mL of tyrosinase and dried. The 10 mg of Enzyme-MWCNTs were then mixed with soft conductive, silicone composite pre-mix. Accordingly, the ratio of functionalized to non-functionalized MWCNTs was 1:10 w/w per gram of soft silicone pre-mix. As such, the functionalized carbon nanotubes can be present at about 1 mg MWCNTs per gram of soft silicone matrix pre-mix. The non-functionalized carbon nanotubes can be present at about 10 mg of non-functionalized MWCNTs that were adsorbed with 100 μL of 2 mg/ml of tyrosinase enzyme, which results in about 0.2 mg Enzyme max per 10 mg MWCNTs. In an example, there can be about 10 mg of enzyme-MWCNTs per gram of silicone after mixing, and thereby 11/1000=~1.1% of carbon nanotubes per silicone pre-mix.

The data in above table suggests that the CNT characteristics make a difference in the bulk resistivity of the silicone matrix. Although the MWCNT is expected to be more conductive due the multiple walls, it was less conductive when mixed with silicone as a filler. It is possible that the way the carbon nanotubes are incorporated into the matrix during the cross-linking process plays a role in the final conductivity. The relative length and number of walls may play a role in the miscibility and distribution of CNTs in the silicone matrix.

In electrochemical settings, the functionalized CNTs helped to make the soft-silicone matrix conductive for in vivo coating applications. The following Table 7 shows the relatively low w:w percentages of functionalized CNTs: silicone premix needed to achieve ~1 Mohm impedance at 1 kHz for various probes.

TABLE 7

| CNT Type | % CNT Weight needed to achieve ~0.5-1 Mohm resistance at 1 kHz on 100 μm diameter insulated probe (tungsten, Pt, or Pt/Ir) with only bottom face exposed, (thin film resistance) |
| --- | --- |
| SWCNT-COOH in tissue matched silicone matrix | ~0.03-0.05% |
| MWCNT-COOH in tissue matched silicone matrix | ~0.1-0.15% |

The impedances at 1 kHz Impedances were measured in a saline (0.9%) buffer with a platinum counter electrode. In a different study using various types of carbon fibers, we placed ~1 cm of the carbon fiber into a saline buffer solution with platinum counter electrode and Ag/AgCl reference and measured the impedance at 1 kHz.

Bare fibers with no insulation or insulated fibers with broken tip with about 100 μm width can provide about 80-300 ohms. Carbon fibers insulated with 2 layers of thin brain epoxy (~100 μm) can provide about 0.8-4.5 kohms. Epoxy insulated fibers with 0.025% MWCNT-COOH/soft matrix interface can provide about 3.71-3.77 Mohms. Epoxy insulated fibers with 0.5% MWCNT-COOH/soft matrix interface can provide about 250 kOhms. Epoxy insulated carbon fibers with 1% MWCNT-COOH/soft matrix interface can provide about 57.7-58.9 kohms.

Figure 11:
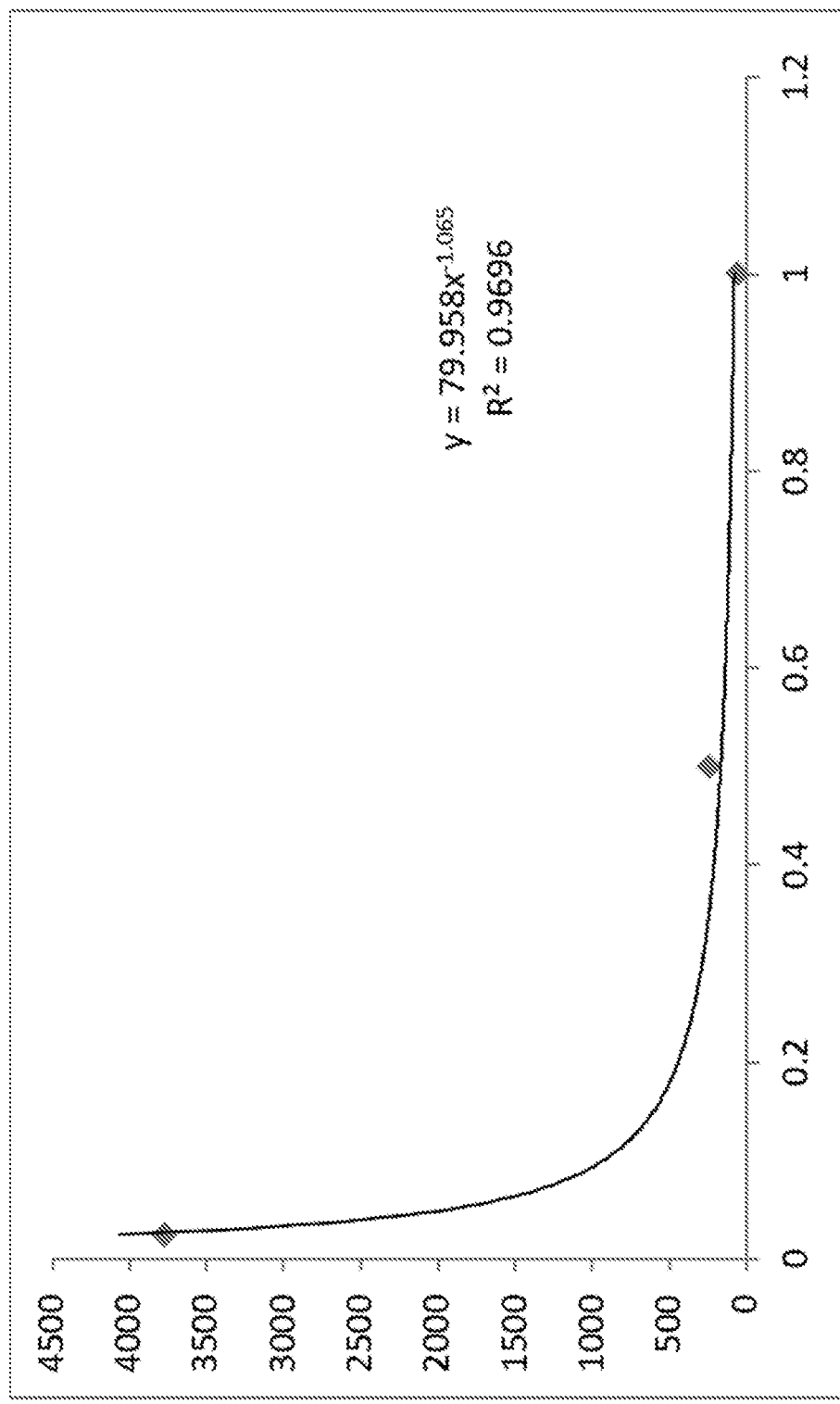
FIG. 11 includes a graph that shows the effect of MWCNT-COOHs on the electrochemical conductivity of a soft, conductive silicone matrix on epoxy-insulated carbon fiber for biological interface applications.

FIG. 11 includes a graph that shows the effect of MWCNT-COOHs on the electrochemical conductivity of a soft, conductive silicone matrix on epoxy-insulated carbon fiber for biological interface applications.

In an example, tyrosinase enzyme was immobilized in the soft silicone matrix system, and carbon fibers were coated with 1:10 (MWCNT-COOH): MWCNT-Enzyme. It is estimated that about 3 μg of enzyme in silicone was immobilized on the carbon fiber ~(100 μm feature size) based on total fabrication of 15 carbon-fiber samples per batch of enzyme-silicone premix containing total of 0.05 mg of enzyme. The typical impedance of bioactive enzyme embedded coated on carbon fiber was ~13 kOhms. The carbon-fibers were not epoxy-insulated. This result suggests that enzyme-immobilization on non-functionalized CNTs in the matrix contributed to the overall conductivity of the composite.

Improved bioactivity can be obtained with shorter cure times. An example protocol includes the following process for enzyme incorporation into the soft-silicone matrix. After coating the carbon-fiber with the enzyme-soft silicone matrix premix, the curing of the thin coating (<300 μm) was performed at 95-100° C. for 3 min in 12-15% humidity conditions (controlled environment) with subsequent submersion of the cured matrix-probe in deionized water for 3 hours and then storage in aCSF. The humidity conditions can be used to modulate the curing time since the heat dissipation post cure decreases with increased relative humidity. Accordingly the curing time of 3 min is valid at 12-15% humidity.

Another protocol can include the following. Dissolve lyophilized tyrosinase (Sigma) to ~2.0 mg/ml and incubate 100 μL of this enzyme solution with 10 mg of non-functionalized MWCNTs (physically adsorption process). Dry overnight (18-20 degrees C.) under biological hood for dust-free, sterile conditions on Whatman filter paper. To generate bioactive scaffold, mix the enzyme-immobilized MWCNTs with soft, conductive silicone pre-mix (typically stored at −20° C. in prefilled syringes). The bioactive silicone mixture is coated over a carbon fiber (<300 μm thick) and cured over a hot plate at 95-100° C. for 3 min in a controlled environmental chamber (2°3C, 12-15% humidity) and washed in deionized water for 3 hours and stored in aCSF at 4° C.

Accordingly, the soft conducive matrix increases durability and longevity of the underlying implant. However, the soft conducive matrix does reduce sensitivity, but the sensitivity is still sufficient for functionality. Thus, the soft conductive matrix provides a useful implant that can function for a longer duration and be used in extended use situations with a suitable level of sensitivity.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

This patent application cross-references PCT Application No. PCT/US2017/045470 filed Aug. 4, 2017, which claims priority to U.S. Provisional Application No. 62/370,836 filed Aug. 4, 2016 which applications are incorporated herein by specific reference in their entirety.

All references recited herein are incorporated herein by specific reference in their entirety, such as the following references:

Alhadrami, H. A. et al. (2017) Biotechnology and Applied Biochemistry.
Bazaka, K, and Jacob M V. (2013) Electronics 2:1-34.
Cash, K J, and Clark H A. (2010) Trends in Molecular Medicine 16(12):584-593.
Clark, J. J. et al. (2010) Nature Methods. 7(2): 126-129.
Cinquin, P. et al. (2010) PLos One. 5(5):e10476.
Corderio, C. A. et al. (2015) Biosensors and Bioeelectronics. 67:677-686.
Garris, P. A. and Wightman R. M. (1994) Journal of Neuroscience. 14(1) 442-450.
Joon, J. et al. (2016) Biomed Eng Lett. 6: 123-133.
Lillehoj, P B, et al. (2014) Journal of Laboratory Automation. 19(1):42-49.
Mannoor, M. S., et al. (2010) PNAS 107(45):19207-19212.
Monosik, R. et al. (2012) Acta Chimica Slovaka. 5(1):109-120.
Muller, A. et al. (2014) Nature Methods. 11(12): 1245.
Niroula, J. et al (2016). Chem Comm. 52-13039.
Njagi, J. et al. (2010) Analytical Chemistry 82:989-996.
Rochitta, G. et al. (2016) Sensors. 16:780.
Tolosa, V. et al. (2013) Biosensors and Bioelectronics. 42:256-260.
Vaddiraju, S. et al (2009) Biosensors and Bioelectronics. 1554-1567.
Wilson, G S, and Gifford, R. (2005) Biosensors and Bioelectronics 20: 2388-2403.
Zebda, A. et al. (2012). Scientific Reports. 3:1516.
Ahuja, T. et al. (2015) Biomaterials. 28(5): 791-805.
Gabriela, P. et al. (2011). Sensors for Health, Environment, and Biosecurity: Chapter 17.
Guazzaroni, M. et al (2012). Bioorganic and Medicinal Chemistry. 20(1): 157-166.
Ozer, BC., et al. (2007) Enzyme and Microbial Technology. 40(2):262-265.
Puentes-camacho, D. et al. (2017) Adv, Nat. Sci.: Nanosci. Nanotechlogy 8:045011.
Reuillard, B. et al. (2012) Electrochemical Communications. 20:19-22.
Sasso, S. V., et al. (1990). Analytical Chemistry. 62(11): 1111-1117.
Sen, S., et al. (2008) Journal of Macromolecular Science: Part A. 45(6): 485:494.
Singh, Y. S. et al. (2011). Analytical Chemistry. 83: 6658-666.
Tingry, S. et al. (2006) Material Science and Engineering C. 26(2-3) 222-226.
Wang, Z. and Dai, Z. (2015) Nanoscale 7: 6420-6431.
Arslan, A. et al. (2005) International Journal of Biological Macromolecules. 35(3-4):163-167.
deMelo junior, MR. et al. (2008) Reactive and Functional Polymers. 68(1):315-320.
Li, Y., et al. (2012) Central Chemistry Journal. 6(103).
Nagarale, R. et al. (2009) Electrochimica Acta. 54(26): 6508-6514.
Skotheim, (1992) U.S. Pat. No. 508,112A.
Rodeberg, N T. et al (2017). ACS Chem Neuroscience. 8(2): 221-234.
Walcaius, A. (2001). Chemistry of Materials. 13(10):3351-3372.
Zimmerman, J. B, and Wightman, R. M. (1992) Analytical Chemistry. 63:24-28.
Jin, Z-H, et al. (2017) Analytical Chemistry. 89:2032-2038.
Lee, J-Y, et al. (2009) Thin Solid Films. 517(14):3883-3887.
Li, J; Lee, E. (2015) Biosensors and Bioelectronics. 71: 414-419.
Xu, J., et al. (2017) Journal of Electroanalytical Chemistry. 806:68-74.

The invention claimed is:
1. A system, comprising:
an electrochemical biosensor,
the electrochemical biosensor comprising a soft conductive composite composition comprising:
a silicone composition having an elastic modulus between 2 kPa and 9 kPa;
a bioactive component; and
carbon nanotubes in the silicone composition,
wherein:
the carbon nanotubes have at least 2 walls and the carbon nanotubes comprise a first plurality of carbon nanotubes modified by a first functional group and a second plurality of carbon nanotubes modified by the bioactive component;

the first plurality of carbon nanotubes and the second plurality of carbon nanotubes are at a ratio of 1:2 to 1:20 w/w;

the bioactive component is capable of performing a biochemical reaction with a substrate utilizing the second plurality of carbon nanotubes; and the first functional group is selected from the group consisting of carboxylic acid, alkanes, alkenes, alkynes, amides, hydrides, heterocycles, transition metal oxides, peptides, DNAs, RNAs, and proteins.

2. The system of claim 1, having a characteristic selected from the group consisting of:

the ratio being 1:10 w/w of the first plurality of carbon nanotubes to the second plurality of carbon nanotubes;

the carbon nanotubes having 2 to 50 walls;

the carbon nanotubes having a length of 5 µm to 100 µm; and the carbon nanotubes having a resistivity of 1 kohms to 500 kohms across 1 cm length cylinder.

3. The system of claim 1, wherein the soft conductive composite composition has a characteristic selected from the group consisting of:

an elastic modulus and/or a short-term relaxation time-constant matched with a soft tissue of interest; and a short-term relaxation time-constant of 2 to 30 seconds.

4. The system of claim 1, having a characteristic selected from the group consisting of:

the soft conductive composite composition being on at least part of a surface of an implantable medical device;

at least a portion of a non-implantable medical device being coated with the soft conductive composite composition; and the soft conductive composite composition at least partially coating a metal material or doped semiconductor material.

5. The system of claim 1, wherein the soft conductive composite composition comprises an anti-inflammatory agent.

6. The system of claim 1, wherein the soft conductive composite composition has a biocompatible coating.

7. The system of claim 1, having a characteristic selected from the group consisting of:

the carbon nanotubes being present at 1 mg to 100 mg per 1 gram of the silicone composition;

the carbon nanotubes being present at less than 5% w/w of the silicone composition;

the first plurality of carbon nanotubes being coupled to carboxylic acid functional groups;

at least a portion of the carbon nanotubes not being associated with the bioactive component;

at least a portion of the second plurality of carbon nanotubes having the bioactive component adsorbed thereon; and at least a portion of the second plurality of carbon nanotubes having the bioactive component covalently coupled thereto.

8. The system of claim 1, wherein the bioactive component is an enzyme.

9. A method of making the system of claim 1, the method comprising:

selecting a PDMS precursor;

selecting the carbon nanotubes to have the ratio of the first plurality of carbon nanotubes to the second plurality of carbon nanotubes;

adsorbing a bioactive agent onto at least a portion of the carbon nanotubes;

cross-linking the PDMS precursor to obtain the silicone composition; and introducing the carbon nanotubes into the PDMS precursor and/or crosslinked PDMS to form the soft conductive composite composition.

10. The method of claim 9, further comprising coating the soft conductive composite composition onto at least a portion of a hard body, wherein the body includes metal portions and/or doped semiconductor portions.

11. The method of claim 10, further comprising at least one of:

degassing/de-bubbling the soft conductive composite composition;

dry incubating the body coated with the soft conductive composite composition;

curing the soft conductive composite composition onto the body; or rinsing the soft conductive composite composition with deionized water;

passivating the soft conductive composite composition with a composition having: sodium chloride, sodium bicarbonate, sodium phosphate monobasic, magnesium chloride, and glucose in filtered, deionized water;

controlling the degree of crosslinking the PDMS precursor to obtain the elastic modulus; or using a tuning curve for elasticity versus ratio of crosslinker to base to tune the elastic modulus to match an elastic modulus of a cortical brain, and with an elastic modulus of approximately 5±3 kPa with shear modulus of 1.2-1.4 kPa.

12. The method of claim 9, comprising:

obtaining a crosslinker to base curve for a crosslinker and a base PDMS precursor;

determining a desired elastic modulus and short-term relaxation time-constant;

determining an amount of crosslinker for an amount of base PDMS precursor; and crosslinking the base PDMS precursor with the amount of crosslinker according to the curve to obtain the desired elastic modulus and short-term relaxation time-constant for the soft conductive composite composition.

13. The method of claim 9, comprising at least one of:

making the surface of the soft conductive composite composition hydrophilic;

coating the surface of the soft conductive composite composition with a hydrophilic coating;

incubating the soft conductive composite composition in a fluid having an osmolarity of brain; or passivating the surface of the soft conductive composite composition for 24 hours.

14. A method of measuring properties at a neural interface, the method comprising:

providing a neural probe comprising the system of claim 1;

implanting the neural probe having the soft conductive composite composition at a neural interface; and measuring a property with the neural probe.

15. The method of claim 14, further comprising at least one of:

measuring stability of electro-chemical impedance;

performing neural recordings; or performing electrochemical impedance spectroscopy with the neural probe.

16. The method of claim 14, further comprising at least one of:

incising dura for implantation of the neural probe;
placing gelfoam over the neural probe after implantation;
implanting the neural probe into a neural interface of brain; or
securing the neural probe onto a skull.

17. The system of claim 1, wherein the bioactive component is selected from the group consisting of glucose oxidase, glucose-1-dehydrogenase, hexokinase, lactate oxidase, pyruvate oxidase, pyrrole-quinolinequinone enzyme, catalase, horseradish peroxidase, neurotransmitter sensitive enzyme, polyphenol oxidase, glutamate oxidase, acetylcholinesterase, choline oxidase, protein receptor, extracellular matrix derived peptide, and/or nucleotide-based oligomer.

18. A device, comprising:
a body; and
an electrochemical biosensor,
the electrochemical biosensor comprising a soft conductive composite composition,
wherein the soft conductive composite composition includes:
a silicone composition having an elastic modulus between 2 kPa and 9 kPa;
a bioactive component; and
carbon nanotubes in the silicone composition,
wherein:
the carbon nanotubes have at least 2 walls and the carbon nanotubes comprise a first plurality of carbon nanotubes modified by a first functional group and a second plurality of carbon nanotubes modified by the bioactive component;
the first plurality of carbon nanotubes and the second plurality of carbon nanotubes are at a ratio of 1:2 to 1:20 w/w;
the bioactive component is capable of performing a biochemical reaction with a substrate utilizing the second plurality of carbon nanotubes;
the first functional group is selected from the group consisting of carboxylic acid, alkanes, alkenes, alkynes, amides, hydrides, heterocycles, transition metal oxides, peptides, DNAs, RNAs, and proteins; and
the soft conductive composite composition coats at least a portion of the body.

19. The device of claim 18, wherein the soft conductive composite composition has a characteristic selected from the group consisting of:
the ratio being 1:10 w/w of the first plurality of carbon nanotubes to the second plurality of carbon nanotubes;
the carbon nanotubes having 2 to 50 walls;
the carbon nanotubes having a length of 5 μm to 100 μm; and
the carbon nanotubes having a resistivity of 1 kohms to 500 kohms across 1 cm length cylinder.

20. The device of claim 18, wherein the body is at least one selected from among a probe, an electrode, and an implant; or the body is configured for a removable insertion into a living organism.

21. The device of claim 18, wherein the soft conductive composite composition comprises an anti-inflammatory agent.

22. The device of claim 18, wherein the soft conductive composite composition has a biocompatible coating.

23. The device of claim 18, comprising insulation between a surface of the body and the soft conductive composite composition.

24. The device of claim 18, wherein the body comprises:
a metal selected from the group consisting of stainless steel, platinum, platinum-iridium, silver/silver-chloride, gold, and tungsten; or
a doped single-crystal or polycrystalline semiconductor or carbon.

25. The device of claim 18, wherein the bioactive component is selected from the group consisting of glucose oxidase, glucose-1-dehydrogenase, hexokinase, lactate oxidase, pyruvate oxidase, pyrrole-quinolinequinone enzyme, catalase, horseradish peroxidase, neurotransmitter sensitive enzyme, polyphenol oxidase, glutamate oxidase, acetylcholinesterase, choline oxidase, protein receptor, extracellular matrix derived peptide, and/or nucleotide-based oligomer.

* * * * *